(12) United States Patent
Truong et al.

(10) Patent No.: US 12,180,989 B2
(45) Date of Patent: Dec. 31, 2024

(54) THREADED FASTENER

(71) Applicant: Illinois Tool Works Inc., Glenview, IL (US)

(72) Inventors: Victor Truong, Chicago, IL (US); Michael C. Dill, Elk Grove Village, IL (US); Yongping Gong, Wilmette, IL (US); Mark D. Latz, Oak Forest, IL (US)

(73) Assignee: Illinois Tool Works Inc., Glenview, IL (US)

( * ) Notice: Subject to any disclaimer, the term of this patent is extended or adjusted under 35 U.S.C. 154(b) by 1 day.

(21) Appl. No.: 18/343,378

(22) Filed: Jun. 28, 2023

(65) Prior Publication Data
US 2023/0340984 A1    Oct. 26, 2023

Related U.S. Application Data

(63) Continuation of application No. 17/325,842, filed on May 20, 2021, now Pat. No. 11,719,272, which is a
(Continued)

(51) Int. Cl.
*F16B 31/02* (2006.01)
*F16B 25/10* (2006.01)
(Continued)

(52) U.S. Cl.
CPC ............ *F16B 31/02* (2013.01); *F16B 25/106* (2013.01); *F16B 35/06* (2013.01); *F16B 25/0026* (2013.01);
(Continued)

(58) Field of Classification Search
CPC ............. F16B 25/0026; F16B 25/0068; F16B 25/106; F16B 31/02; F16B 35/06; F16B 39/282
(Continued)

(56) References Cited

U.S. PATENT DOCUMENTS

| 87,717 A | 3/1869 | Smith |
|---|---|---|
| 3,389,734 A | 6/1968 | Guthall |

(Continued)

FOREIGN PATENT DOCUMENTS

| DE | 296 09 008 | 8/1996 |
|---|---|---|
| DE | 10 2010 030 893 | 1/2012 |

(Continued)

OTHER PUBLICATIONS

European Office Action for European Application No. 18769935.0, mailed Aug. 11, 2022 (3 pages).

(Continued)

*Primary Examiner* — Roberta S Delisle
(74) *Attorney, Agent, or Firm* — Neal, Gerber & Eisenberg LLP

(57) ABSTRACT

Various embodiments provide a fastener including a head, a shank connected to the head and having a tip, one or more helical thread formations extending outwardly from the shank, and wherein a bottom portion of the head includes a plurality of ribs that extend towards the tip of the shank and that are shaped to abruptly frictionally engage a surface of a first object being attached to a second object to create an immediate frictional torsional resistance of a desired force level to the tightening of the fastener. This frictional resistance is provided back to the tightening tool to inform the operator of the tightening tool that the head of the fastener has sufficiently engaged the first object and that further tightening or clockwise rotation of the fastener is unnecessary.

20 Claims, 19 Drawing Sheets

Related U.S. Application Data continuation of application No. 16/115,797, filed on Aug. 29, 2018, now Pat. No. 11,035,399.

(60) Provisional application No. 62/633,181, filed on Feb. 21, 2018, provisional application No. 62/558,084, filed on Sep. 13, 2017.

(51) Int. Cl.
  *F16B 35/06*  (2006.01)
  *F16B 25/00*  (2006.01)
  *F16B 39/282* (2006.01)

(52) U.S. Cl.
  CPC ......... *F16B 25/0068* (2013.01); *F16B 39/282* (2013.01)

(58) Field of Classification Search
  USPC .................................................. 411/411, 412
  See application file for complete search history.

(56) References Cited

U.S. PATENT DOCUMENTS

| | | | |
|---|---|---|---|
| 3,540,509 | A | 11/1970 | Gutshall |
| 3,605,845 | A | 9/1971 | Junker |
| 3,825,051 | A | 7/1974 | Sigmund |
| 3,926,237 | A | 12/1975 | Enders |
| 4,223,711 | A | 9/1980 | Tabor |
| 4,310,272 | A | 1/1982 | Rich et al. |
| 4,518,294 | A | 5/1985 | Barth |
| 4,705,441 | A | 11/1987 | Arnold |
| 4,749,319 | A | 6/1988 | Sygnator |
| 4,764,066 | A | 8/1988 | Terrell et al. |
| 4,812,095 | A | 3/1989 | Piacenti et al. |
| D34,786 | S | 6/1994 | Carruthers |
| 5,626,449 | A | 5/1997 | McKinlay |
| RE36,741 | E | 6/2000 | Walther |
| 6,558,097 | B2 | 5/2003 | Mallet et al. |
| D563,212 | S | 3/2008 | Campbell |
| 7,462,043 | B2 | 12/2008 | Deisen |
| 8,322,960 | B2 | 12/2012 | Gong et al. |
| 8,591,159 | B2 | 11/2013 | Walther |
| D721,266 | S | 1/2015 | Sun |
| D727,138 | S | 4/2015 | Cross |
| D728,355 | S | 5/2015 | Mai-Krist |
| 9,086,088 | B2 | 7/2015 | Walther |
| 9,523,383 | B2 | 12/2016 | Park |
| D778,715 | S | 2/2017 | Deachin |
| D784,122 | S | 4/2017 | Grangruth |
| 9,732,783 | B2 | 8/2017 | Lee |
| D801,795 | S | 11/2017 | Huang |
| D820,073 | S | 6/2018 | Iacono |
| D850,896 | S | 6/2019 | Shaw |
| D882,384 | S | 4/2020 | Bastian |
| D883,077 | S | 5/2020 | Koelling |
| D899,902 | S | 10/2020 | Barnes |
| 2004/0018043 | A1 | 1/2004 | Yu |
| 2004/0047706 | A1 | 3/2004 | Chang |
| 2006/0216129 | A1 | 9/2006 | Lin |
| 2007/0160418 | A1 | 7/2007 | Lo |
| 2010/0158634 | A1 | 6/2010 | Walther |
| 2010/0278614 | A1 | 11/2010 | Bickford |
| 2011/0064540 | A1 | 3/2011 | Walther |
| 2016/0156166 | A1 | 6/2016 | Yamamoto |
| 2016/0312820 | A1 | 10/2016 | Lor |
| 2018/0135682 | A1 | 5/2018 | Gong et al. |
| 2018/0328392 | A1 | 11/2018 | Yang |
| 2019/0195258 | A1 | 6/2019 | Zimmer |

FOREIGN PATENT DOCUMENTS

| | | |
|---|---|---|
| DE | 20 2015 005206 | 9/2015 |
| WO | WO 2016/205119 | 12/2016 |
| WO | WO 2018/093571 | 5/2018 |

OTHER PUBLICATIONS

International Search Report and Written Opinion from International Application No. PCT/US2018/048838, dated Nov. 16, 2018 (14 pages).

Simpson Strong-Tie Titen® 2 Concrete and Masonry Screw, retrieved from the Internet at https://www.strongtie.com/mechanicalanchors_mechanicalanchoringproducts/ttn2_screw/p/titen-2, Sep. 24, 2018 (available before Feb. 12, 2018)(7 pages).

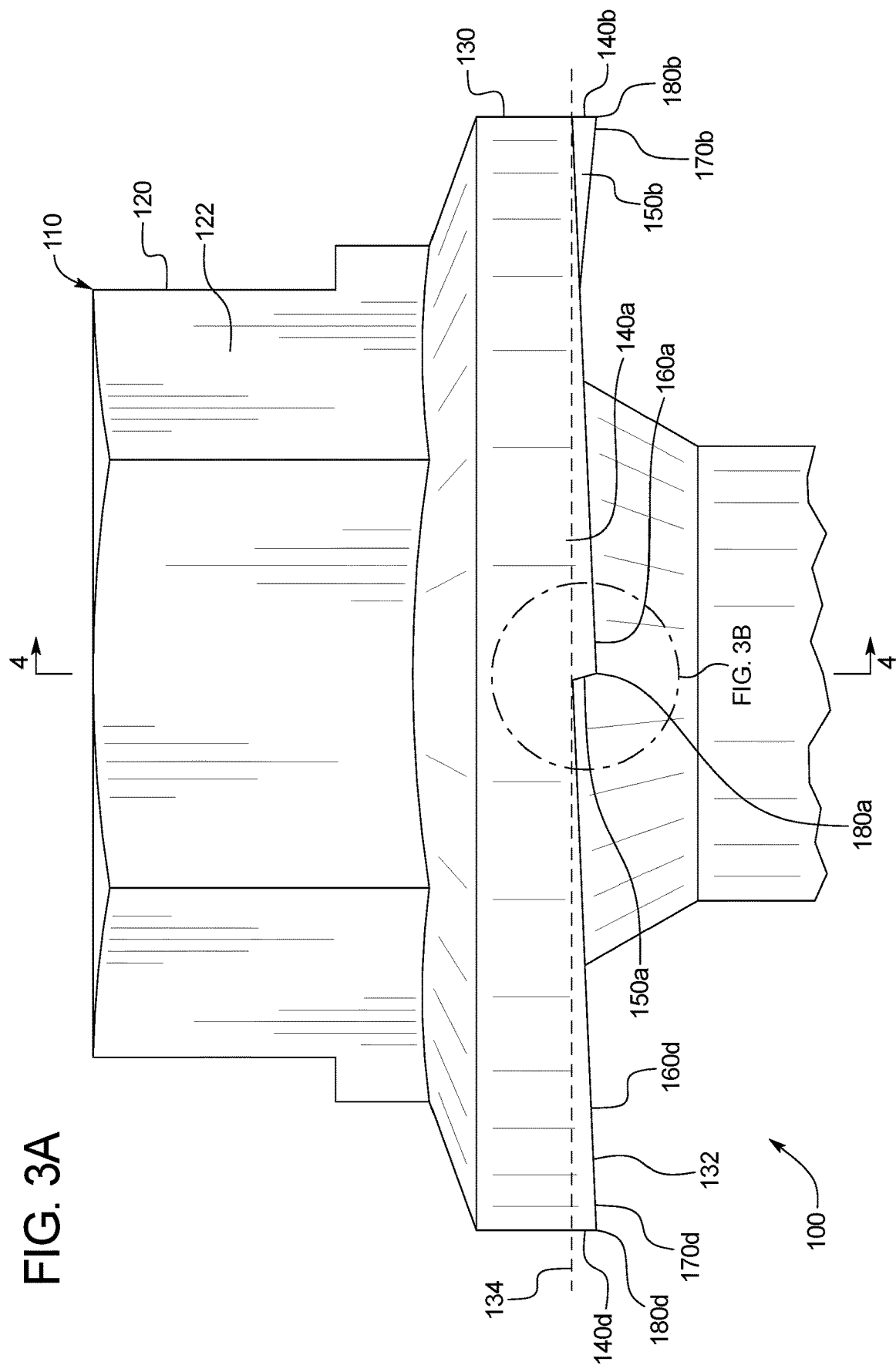

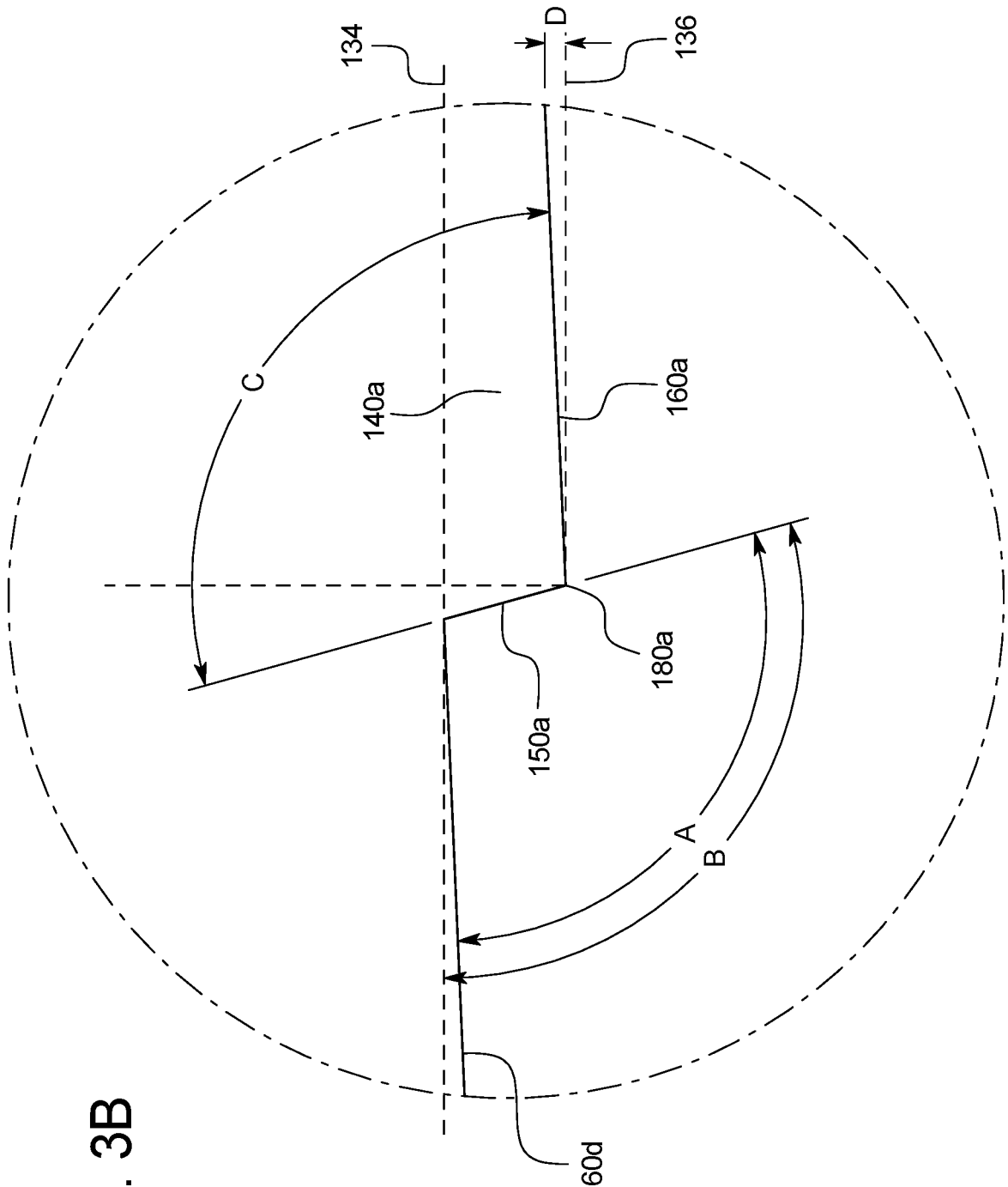

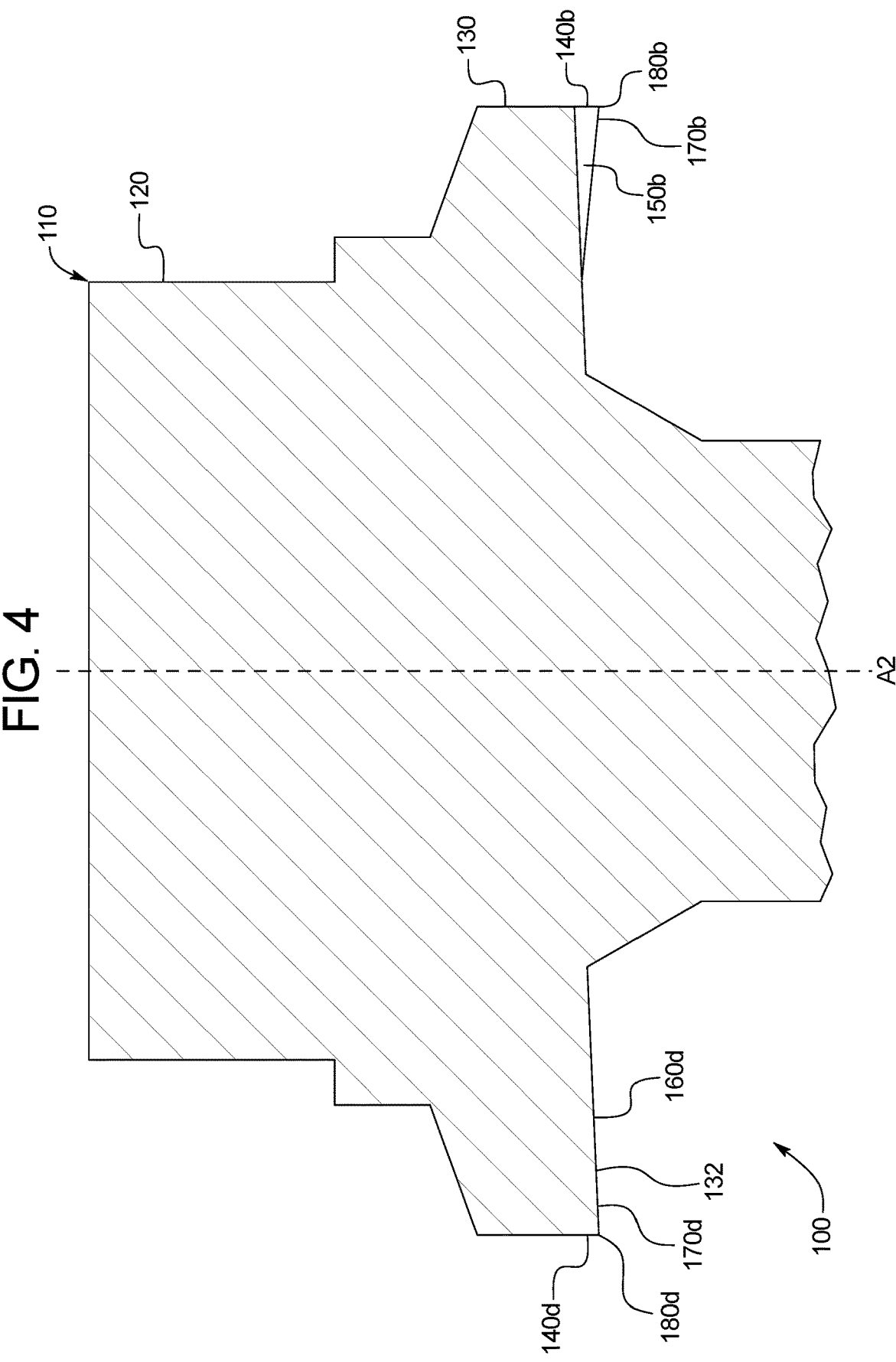

FIG. 9

3/16" Diameter

| | | | | | | | | |
|---|---|---|---|---|---|---|---|---|
| # of Ribs | 4 | 4 | 4 | 4 | 6 | 6 | 6 | 6 |
| Washer Dia. [in.] | 0.345 | 0.365 | 0.345 | 0.365 | 0.345 | 0.365 | 0.345 | 0.365 |
| Shank to Washer Wide Dia. (SWD) [in.] | 0.18 | 0.18 | 0.18 | 0.18 | 0.18 | 0.18 | 0.18 | 0.18 |
| Rib Height (134-136) [in.] | 0.020 | 0.020 | 0.04 | 0.04 | 0.020 | 0.020 | 0.040 | 0.040 |
| Rib Length (136, [washer dia.*pi]/# of ribs) [in.] | 0.270962 | 0.28667 | 0.270962 | 0.28667 | 0.180642 | 0.191114 | 0.180642 | 0.191114 |
| Rib Trail Angle (B-A, inv.tan(rib height/rib length) [degrees] | 4.22140 | 3.99086 | 8.39747 | 7.94337 | 6.31786 | 5.97425 | 12.48571 | 11.82134 |
| Angle A [degrees] | 100.78 | 101.01 | 96.60 | 97.06 | 98.68 | 99.03 | 92.51 | 93.18 |
| Angle B [degrees] | 105.00 | 105.00 | 105.00 | 105.00 | 105.00 | 105.00 | 105.00 | 105.00 |
| Angle C [degrees] | 100.78 | 101.01 | 96.60 | 97.06 | 98.68 | 99.03 | 92.51 | 93.18 |
| Taper Angle 160d (inv.tan(rib height / washer dia. - SWD) [deg.] | 13.62699 | 12.20047 | 25.86636 | 23.38522 | 13.62699 | 12.20047 | 25.86636 | 23.38522 |

FIG. 10

1/4" Diameter

| # of Ribs | 4 | 4 | 4 | 4 | 6 | 6 | 6 | 6 | | | |
|---|---|---|---|---|---|---|---|---|---|---|---|
| Washer Dia. [in.] | 0.398 | 0.432 | 0.398 | 0.432 | 0.398 | 0.432 | 0.398 | 0.432 | | | |
| Shank to Washer Wide Dia. (SWD) [in.] | 0.23 | 0.23 | 0.23 | 0.23 | 0.23 | 0.23 | 0.23 | 0.23 | | | |
| Rib Height (134-136) [in.] | 0.020 | 0.020 | 0.04 | 0.040 | 0.020 | 0.020 | 0.040 | 0.040 | | | |
| Rib Length (136, [washer dia.*pi]/# of ribs) [in.] | 0.312588 | 0.339292 | 0.312588 | 0.339292 | 0.208392 | 0.226195 | 0.208392 | 0.226195 | | | |
| Rib Trail Angle (B-A, invtan(rib height/rib length) [degrees] | 3.66090 | 3.37347 | 7.29215 | 6.72371 | 5.48205 | 5.05292 | 10.86552 | 10.02844 | Min. 3.37 | Max. 12.49 | Rib Trail Angle (B-A, invtan (rib height/rib length) [degrees] |
| Angle A [degrees] | 101.34 | 101.63 | 97.71 | 98.28 | 99.52 | 99.95 | 94.13 | 94.97 | 92.51 | 101.63 | Angle A [degrees] |
| Angle B [degrees] | 105.00 | 105.00 | 105.00 | 105.00 | 105.00 | 105.00 | 105.00 | 105.00 | 105.00 | 105.00 | Angle B [degrees] |
| Angle C [degrees] | 101.34 | 101.63 | 97.71 | 98.28 | 99.52 | 99.95 | 94.13 | 94.97 | 92.51 | 101.63 | Angle C [degrees] |
| Taper Angle 160d (invtan(rib height / washer dia. - SWD) [deg.] | 13.3925 | 11.2008 | 25.46335 | 21.60553 | 13.3925 | 11.2008 | 25.46335 | 21.60553 | 11.20 | 25.87 | Taper Angle 160d (invtan(rib height / washer dia. - SWD) [deg.] |

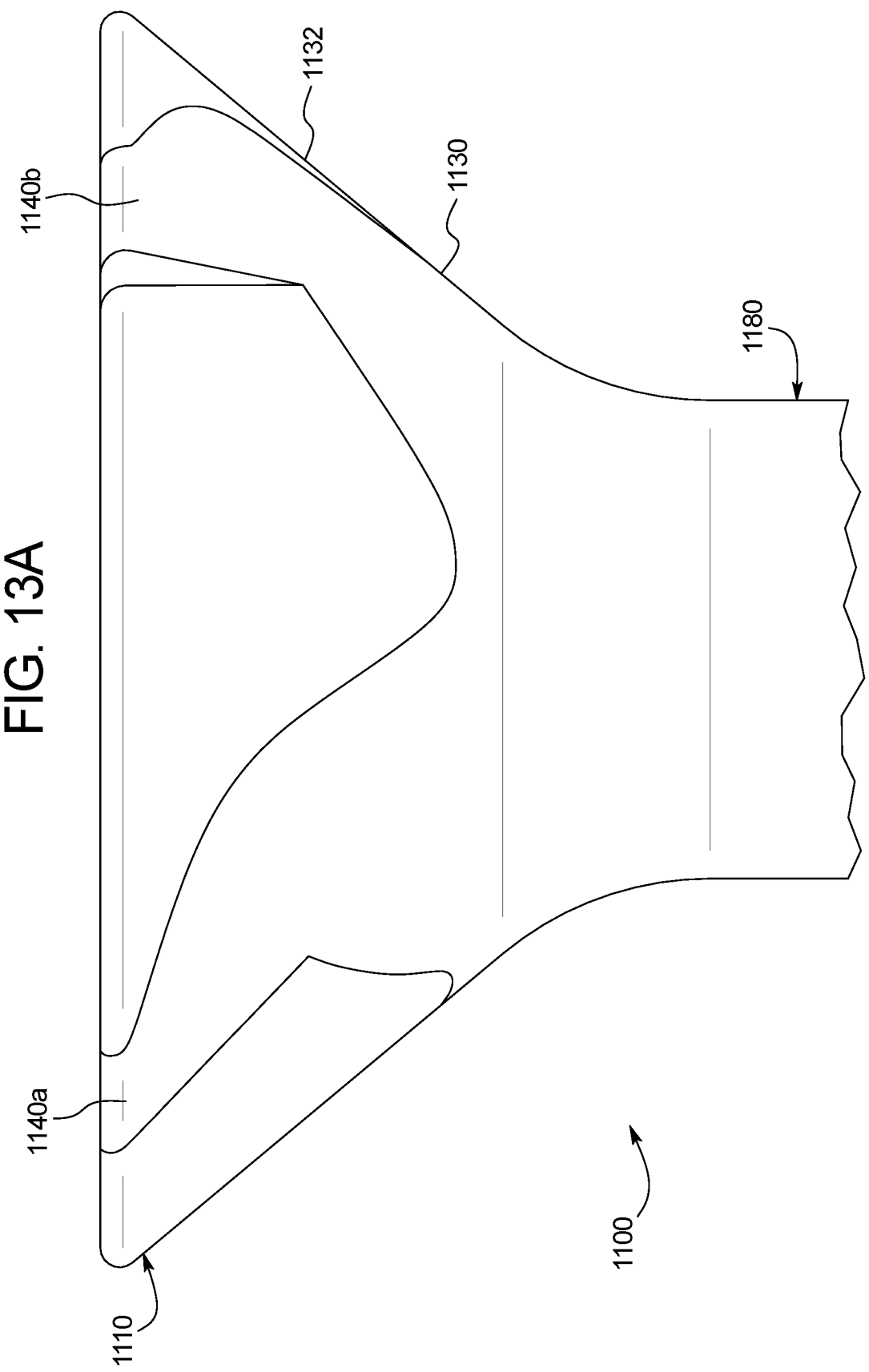

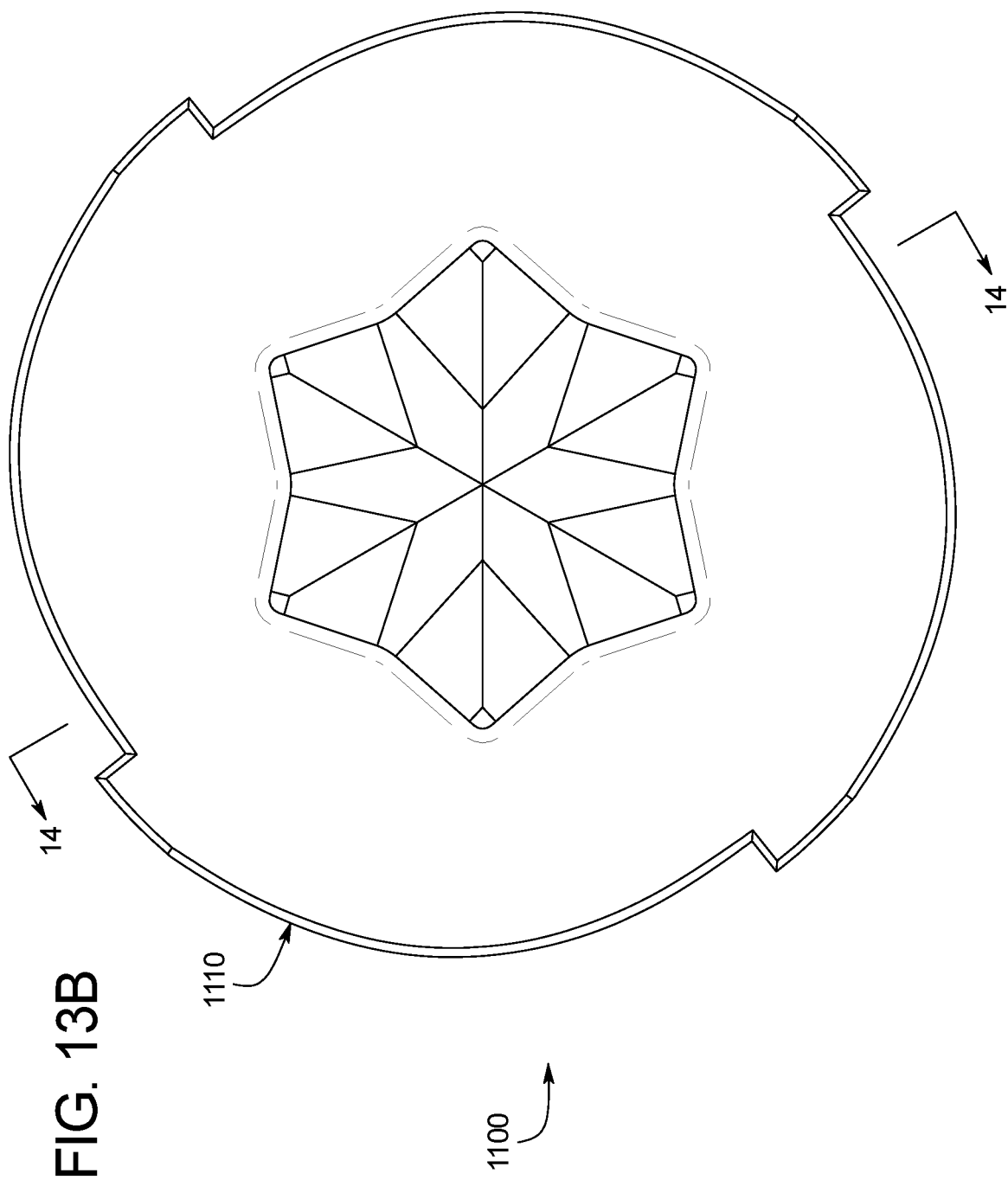

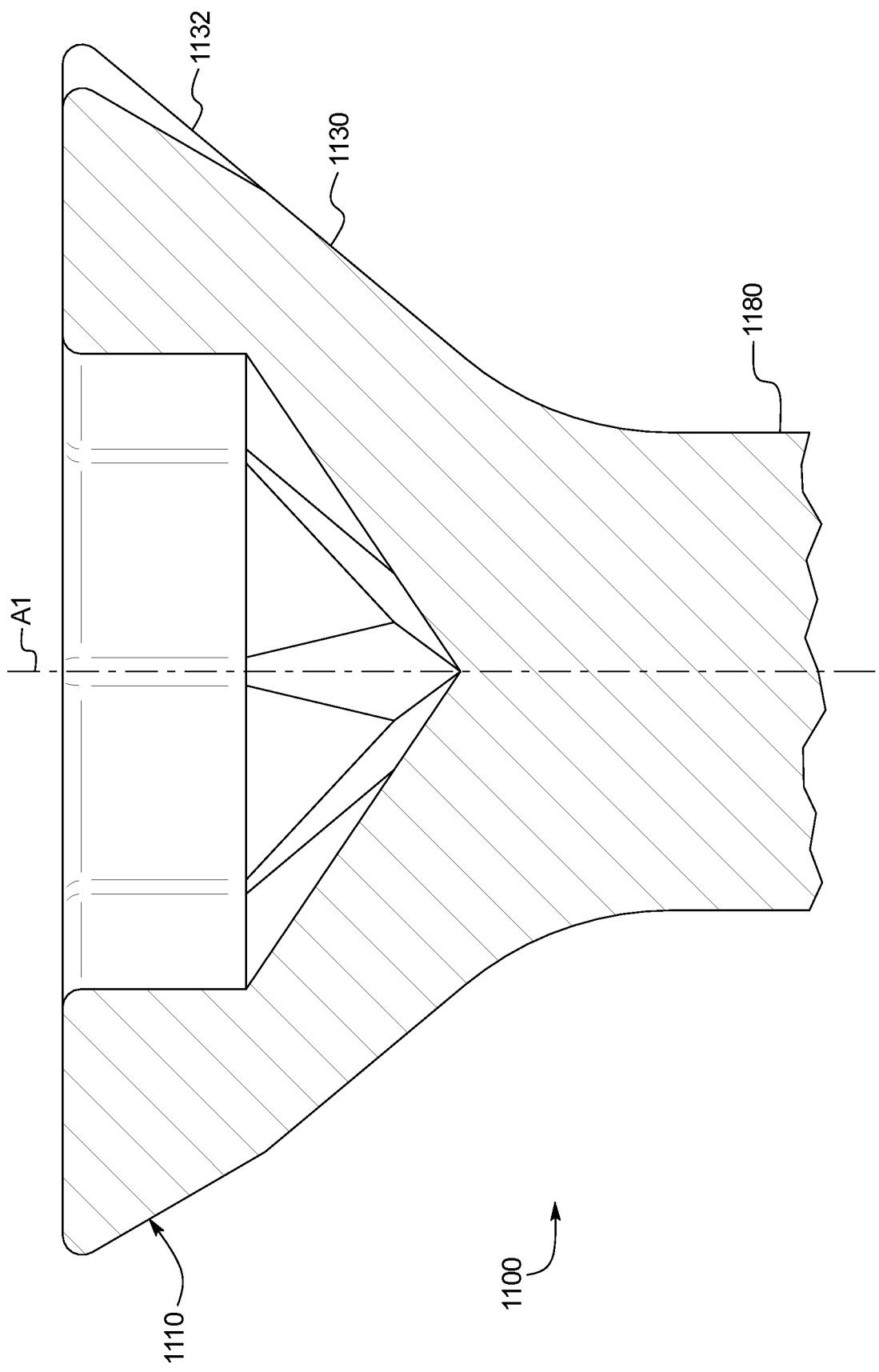

THREADED FASTENER

PRIORITY

This application is a continuation of and claims priority to and the benefit of U.S. patent application Ser. No. 17/325,842, which was filed May 20, 2021, which is a continuation of and claims priority to and the benefit of U.S. patent application Ser. No. 16/115,797, which was filed Aug. 29, 2018, which issued as U.S. Pat. No. 11,035,399 on Jun. 15, 2021, which claims priority to and the benefit of U.S. Provisional Patent Application Ser. No. 62/633,181, filed Feb. 21, 2018, and claims priority to and the benefit of U.S. Provisional Patent Application Ser. No. 62/558,084, filed Sep. 13, 2017, the entire contents of each of which are incorporated herein by reference.

BACKGROUND

The present disclosure relates generally to threaded fasteners that are drivable into a substrate, and more particularly to improved one piece threaded anchors.

Threaded fasteners such as threaded anchors are well known and commercially used throughout the world for securing objects to a variety of substrates. A variety of threaded fasteners can be used to secure objects to concrete, masonry, and other cementitious substrates. Typically, such known threaded fasteners include a head, a shank, and a thread formation on the shank for frictionally engaging the substrate into which the fastener is driven. The head typically includes a mechanical engaging structure for engagement by a tool that is used to rotate the threaded fastener and drive the threaded fastener into the substrate.

Often such threaded fasteners are optimally used by pre-drilling the concrete, masonry, or other substrate, for example with a hammer drill equipped with a masonry drill bit. Once the substrate has been pre-drilled, and a correctly sized cavity formed therein, an appropriately sized threaded fastener may be driven or screwed into the substrate to secure an object thereto. One example of such a threaded fastener is described in U.S. Pat. No. 8,322,960 entitled "Threaded Concrete Anchor" and assigned to Illinois Tool Works Inc. (which is also the assignee of this patent application). Such fasteners are commercially distributed under the TAPCON® trademark, and are sometimes referred to as TAPCON screws or anchors. TAPCON is a registered trademark of Illinois Tool Works Inc.

Often such threaded fasteners are driven into such a substrate using a powered tool, such as an electric or pneumatic power driving tool or impact driver that imparts a rotational force or torque on the threaded fastener. For example, an impact driver may be fitted with an appropriate bit or socket for engaging the complimentary mechanical engaging structure of the head of the threaded fastener, to rotate the threaded fastener in a tightening direction such that the threads of the threaded fastener engage the substrate. When the threaded fastener is rotated in a tightening direction, the threads of the threaded fastener grip the inside surfaces of the substrate that define the cavity (e.g., the surfaces that define the pre-drilled hole in the substrate), causing the threaded fastener to be driven deeper into the substrate until the head of the threaded fastener comes into contact with the object being attached by the threaded fastener to the substrate (such as a bracket, flange, clip, or other mechanical device having a hole in it through which the fastener passes). In the optimal situation, this contact thereby prevents the threaded fastener from being driven, rotated, or tightened further. In the optimal situation, this results in the threaded fastener being fully tightened and the object being affixed to, secured to, or compressed into contact with the substrate.

Certain problems have arisen due to improvements in electric and pneumatic power driving tools that have caused such tools to become capable of delivering relatively higher levels of torque. When such driving tools are used to drive certain known threaded fasteners, such as those described above, the threaded fasteners can be subjected to relatively high amounts of torque from the rotational forces imparted by these power driving tools. For example, as the threads of the threaded fastener engage the substrate, the threaded fastener experiences frictional resistance forces which tend to impede further driving of the threaded fastener into the substrate. At the same time, the power driving tool is imparting a rotational force or torque on the threaded fastener (via the head of the threaded fastener) in an effort to continue to rotate the threaded fastener in a tightening direction and drive it into the substrate. These opposing forces impart significant torsional stresses on the threaded fastener, placing the shank of the threaded fastener under shearing torsional stresses.

These torsional stresses can be so great in various circumstances as to cause the threaded fastener to fail due to the opposing forces or torques placed on the threaded fastener. Over tightening of such threaded fasteners during the driving process is a primary cause of such overstressing of the shank of the threaded fastener, and can result in failure of the threaded fastener due to such excessive torsional forces. Threaded fasteners that are subjected to over tightening often fail along the shank, including an upper portion of the shank adjacent to the head of the threaded fastener. Other failures occur at the top of the shank, just under the head of the threaded fastener. In such failures, the head of the threaded fastener breaks off from the shank, and thus fails to hold the object to the substrate.

Accordingly, there is a need to provide threaded fasteners that solve these problems.

SUMMARY

Various embodiments of the present disclosure provide an improved threaded fastener drivable into a substrate that solves the above problems. For brevity, the threaded fastener of the present disclosure is sometimes referred to herein as the fastener.

In various embodiments of the present disclosure, the fastener includes: (i) a head; (ii) a shank integrally connected to the head at a first end and forming or having a tip at a second end; and (iii) one or more helical thread formations integrally connected to and extending outwardly or transversely from the shank. The shank has a longitudinal axis extending from the head to the tip.

The head includes a top portion distal from the shank, and a bottom portion adjacent to the shank. The top portion of the head defines a mechanical engaging structure engageable by a suitable tool. The bottom portion of the head includes a bottom surface at least partially defined by a plurality of ribs arranged radially around a longitudinal axis of the head. The ribs generally extend in a direction towards the tip of the shank. The ribs are shaped to frictionally engage a surface of a first object being attached to a second object such as a substrate. The ribs are configured to engage and dig into the surface of the first object into which the fastener is driven. The ribs are configured such that as the ribs approach, come into contact with, and dig into the surface of the first object, they create a frictional torsional resistance of a desired force level to the tightening of the fastener. This frictional resistance is provided back to the tightening tool to inform the operator of the tightening tool that the head of the fastener has sufficiently engaged the object and that further tightening or clockwise rotation of the fastener is unnecessary. Thus, the ribs provide protection against over tightening of the fastener, by causing such frictional resistance to the tightening that can be felt by the operator. This reduces the likelihood that the fastener will be over tightened and that the head will break off from the shank. Thus, the structure and configuration of the threaded fastener of the present disclosure provide significant advantages in reducing the likelihood of torsional failure of the fastener and undesirable failures of the fastener from over tightening.

Other objects, features, and advantages of the present disclosure will be apparent from the following detailed disclosure, taken in conjunction with the accompanying sheets of drawings, wherein like reference numerals refer to like parts.

BRIEF DESCRIPTION OF THE FIGURES

FIG. 3A is an enlarged fragmentary side view of the threaded fastener showing the head of the threaded fastener of FIG. 1 and the angles of leading faces and trailing faces of certain ribs of the head.

FIG. 3B is an enlarged side view of the leading face and the trailing face of one of the ribs of the head of the threaded fastener of FIG. 1.

FIG. 4 is an enlarged cross-sectional view of the head of the threaded fastener of FIG. 1 taken substantially through line 4-4 of FIG. 1, and also showing a cross-section of the shank of the fastener.

FIGS. 9 and 10 are charts that provide certain dimensions for example fasteners made in accordance with the present disclosure.

FIG. 13A is an enlarged fragmentary side view of the threaded fastener of FIG. 11A showing the head and the angles of multi-part leading faces and multi-part trailing faces of certain ribs of the head.

FIG. 13B is an enlarged top view of the head of the threaded fastener of FIG. 11A.

FIG. 14 is an enlarged cross-sectional view of the head of the threaded fastener of FIG. 11A taken substantially through line 14-14 of FIG. 13A, and also showing a fragmentary cross-section of the shank of the threaded fastener.

DETAILED DESCRIPTION

Referring now to the Figures, a threaded fastener 100 of one example embodiment of the present disclosure is generally shown in FIGS. 1, 2, 3A, 3B, 4, 5, 6, and 7. The example fastener 100 is configured for use in fastening such as for anchoring objects to substrates, and in particular for securing or anchoring an object or portion of an object to a concrete, masonry, or another such substrate. The example fastener 100 generally includes a head 110, a shank 180 integrally connected to the head 110, and a thread formation 190 integrally connected to and extending outwardly from the shank 180.

Figure 5:
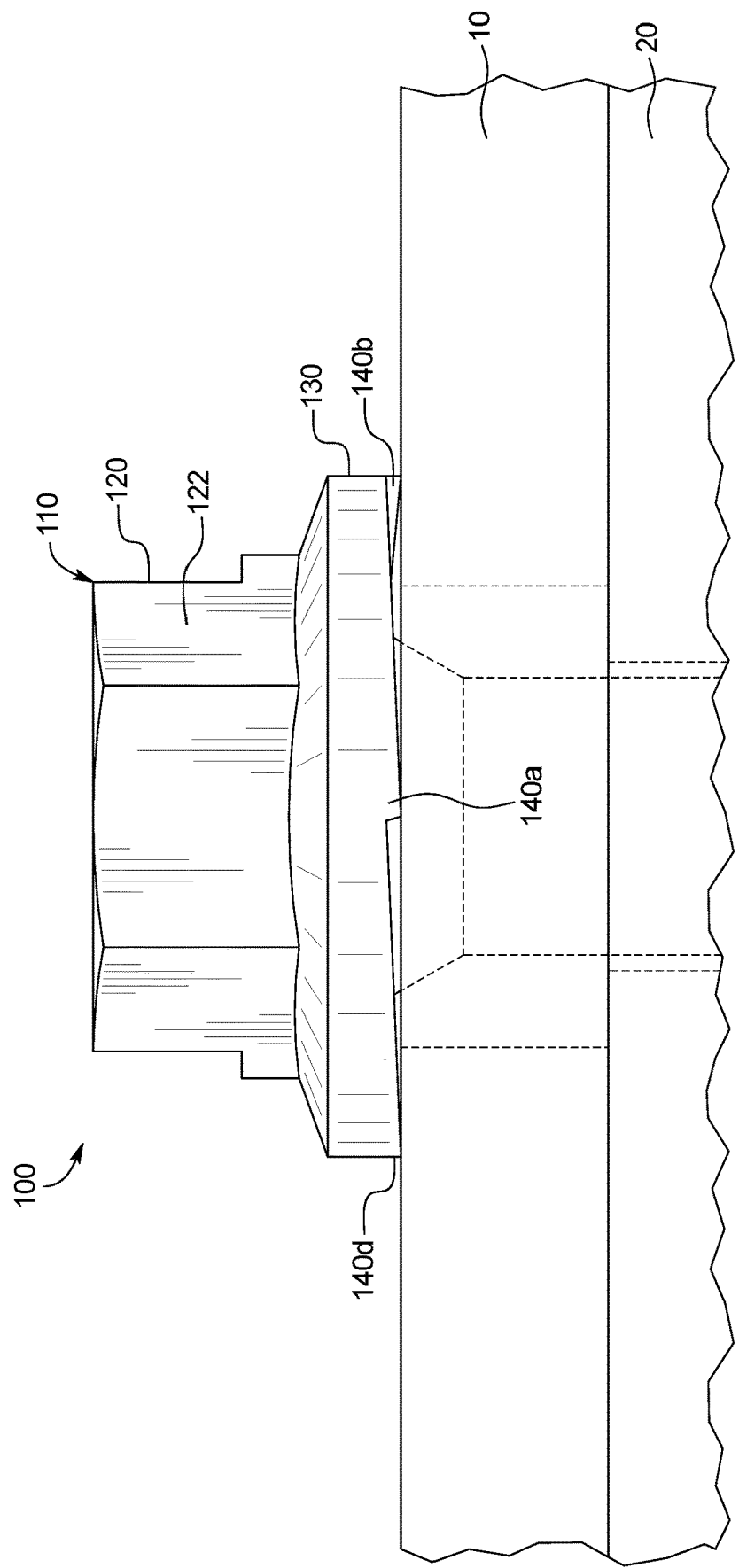
FIG. 5 is an enlarged side fragmentary view of the threaded fastener of FIG. 1 being inserted through an object and into a substrate to attach the object to the substrate, and showing the head of the threaded fastener just as the ribs of the head engage the outer surface of the object.
Figure 6:
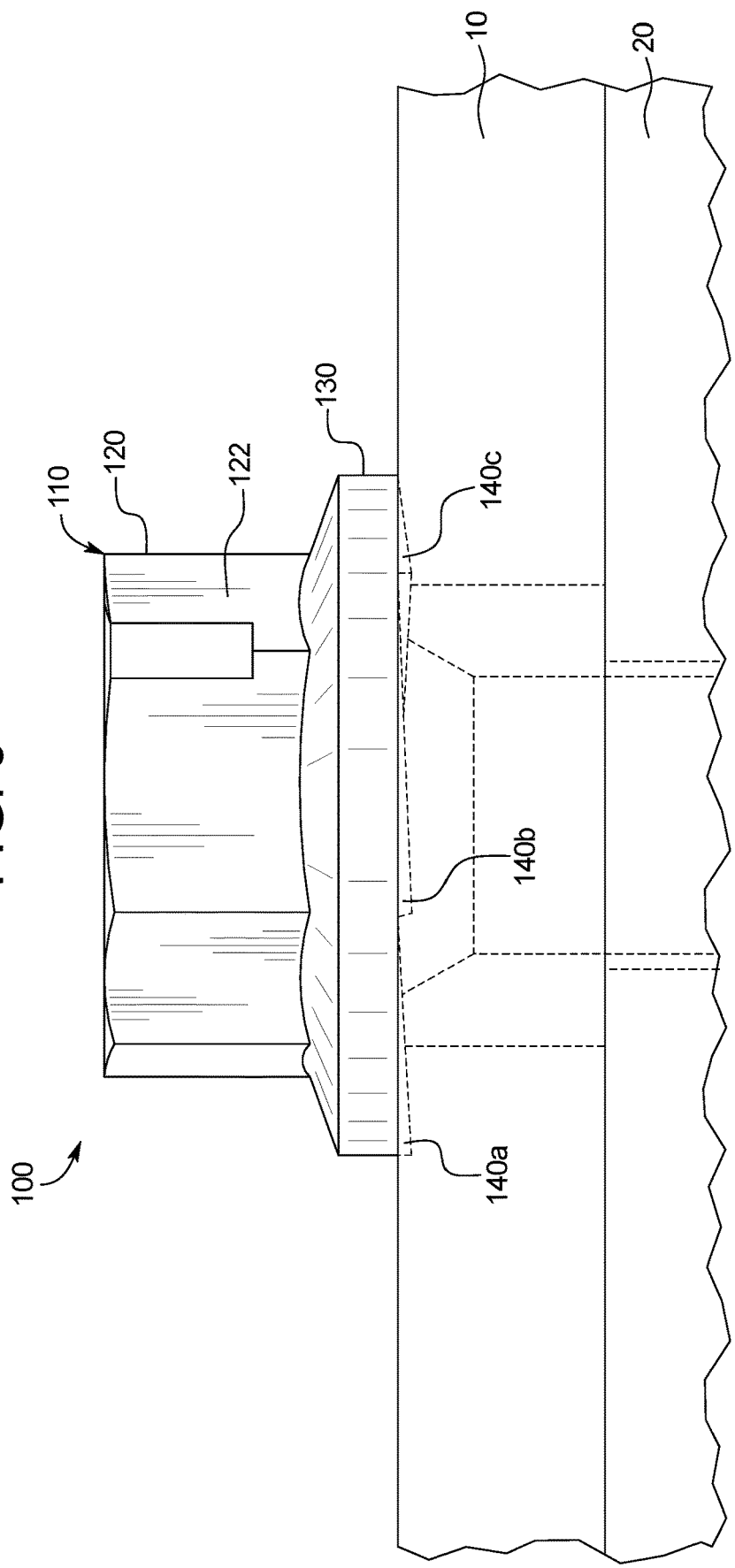
FIG. 6 is an enlarged side fragmentary view of the threaded fastener of FIG. 1 being inserted through an object and into a substrate to attach the object to the substrate, and showing the head of the threaded fastener after the ribs of the head have engaged and dug into or entered into the object.
Figure 7:
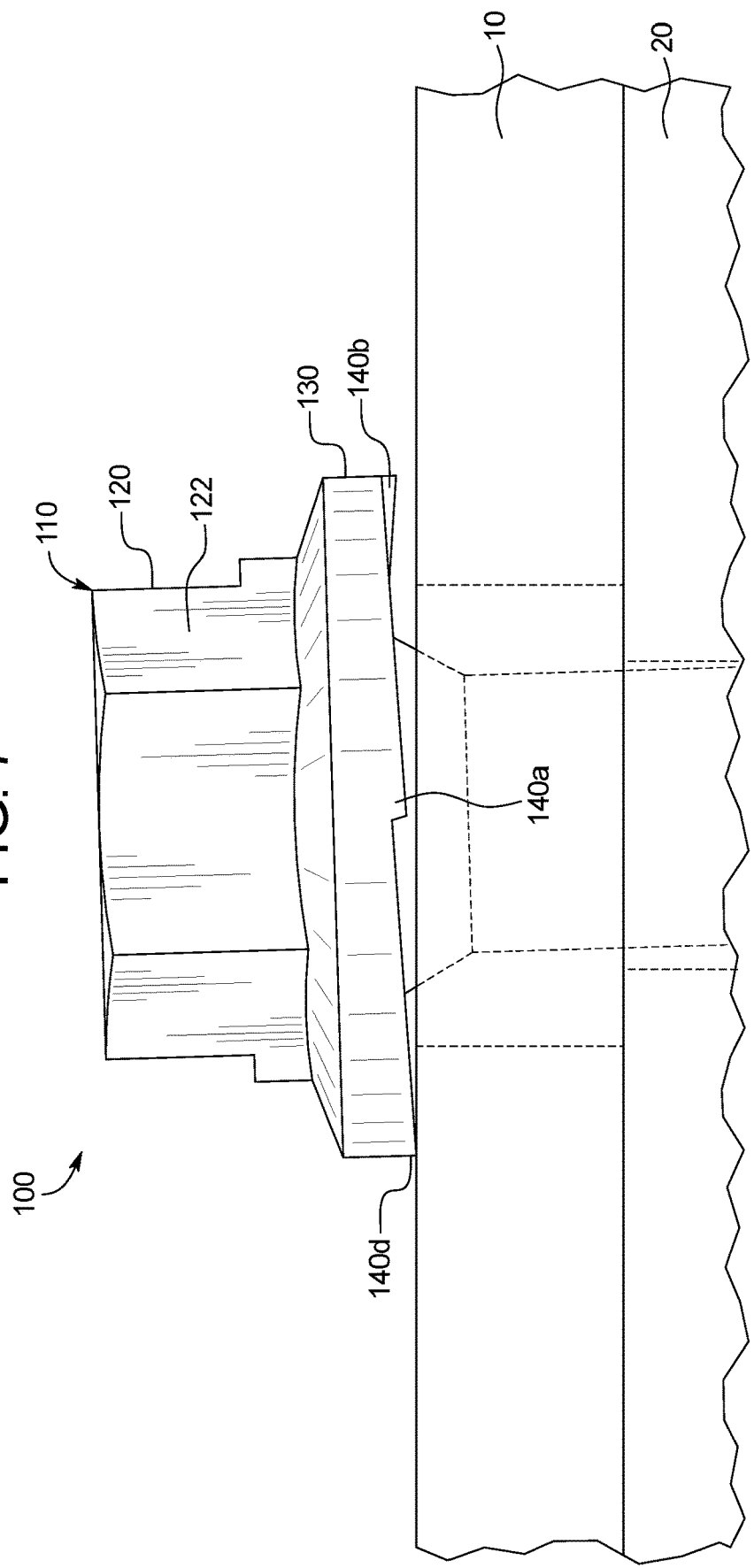
FIG. 7 is an enlarged side fragmentary view of the threaded fastener of FIG. 1 being inserted through an object and into a substrate to attach the object to the substrate, and showing the head of the threaded fastener in an offset position just as one of the ribs of the head engages the outer surface of the object.

In this illustrated example embodiment of this present disclosure, the shank 180 has a first end 182, a second end 184, a length L1, and is integrally connected to the head 110 at the first end 182 of the shank 180. The first end 182 of the shank 180 in this illustrated embodiment includes a chamfered portion. The second end 184 of the shank 180 (that is opposite the first end 182 of the shank 180) forms a tip 186. In this example embodiment, the tip 186 is pointed to aid in penetrating the substrate in which the fastener 100 is driven. The shank 180 has a central longitudinal axis A1 extending along the length L1 of the shank 180, generally from the head 110 to the tip 186 of the shank 180. The shank 180 including the chamfered portion at the first end 182 is configured to fit through the hole in the object 10 as generally shown in FIGS. 5, 6, and 7. It should be appreciated that the configuration of the shank can vary in accordance with the present disclosure.

In this illustrated example embodiment of this present disclosure, the thread formation 190 includes: (a) a first or primary helical thread formation 192 along or extending outwardly or transversely from a portion of the shank 180; and (b) a second or secondary helical thread formation 194 along or extending outwardly or transversely from a portion of the shank 180. It should be appreciated that the formation and configuration of the threads of the respective first and second helical thread formations 192 and 194 may take on a variety of different forms in accordance with the present disclosure. In one embodiment, the first and second helical thread formations 192 and 194 are formed in a manner to maximize grip strength of the fastener 100 for use in concrete, masonry, and other cementitious substrates. One example of the first and second helical thread formations 192 and 194 that may be appropriate for certain applications of the present disclosure are described in U.S. Pat. No. 8,322,960. It should also be appreciated that the quantity of the threads, and specifically the quantity of the first and second helical thread formations may vary in accordance with the present disclosure.

In this illustrated example embodiment of this present disclosure, the head 110 of the fastener 100 includes a top portion 120 distal to and spaced from the shank 180, and a bottom portion 130 proximate to and integrally connected to the shank 180. The top portion 120 of the head 110 defines a mechanical engaging structure 122 that is engageable by an appropriate tool for driving the fastener 100. In this illustrated example embodiment of the present disclosure, the mechanical engaging structure 122 includes a hexagonal shaped bolt head that is engageable by an appropriate tool, such as a socket wrench or impact driver. In other embodiments of the present disclosure, other mechanical engaging structures may be utilized, such as a straight slot (engageable by a flathead screwdriver), a cross-shaped slot (engageable by a Phillips head screwdriver), or a hexagonal shaped cavity (engageable by an Allen wrench). Any suitable mechanical engaging structures rotatable or drivable by one or more suitable tools may be employed as the engaging structure 122 in accordance with the present disclosure. The head 110 has a central longitudinal axis A2 extending from the top portion to the bottom portion, and which is aligned with or extends along the same axis as the longitudinal axis A1 of the shank 180.

The bottom portion 130 of the head 110 includes a bottom surface 132 formed by a plurality of extrusions or ribs, and specifically in this illustrated example embodiment four extrusions or ribs 140a, 140b, 140c, and 140d extending toward the tip 186 of the shank 180. The extrusions or ribs 140a, 140b, 140c, and 140d are arranged radially around the central longitudinal axis A2 of the head 110. The bottom surface 132 of the head 110 in this illustrated embodiment is formed by the extrusions or ribs 140a, 140b, 140c, and 140d and generally faces towards the tip 186 of the shank 180. It should be appreciated that in this illustrated example embodiment, each of the extrusions or ribs 140a, 140b, 140c, and 140d thus provides a part of the bottom surface of the head 110. In other embodiments which are not illustrated, the extrusions or ribs only provide part of the bottom surface of the head of the fastener.

This illustrated example embodiment includes four identically sized and shaped ribs 140a, 140b, 140c, and 140d. In this illustrated example embodiment, each identically configured rib includes a leading face and a trailing face that meet or intersect at an edge of that rib. It should be appreciated that the ribs do not need to be identical in accordance with the present disclosure.

More specifically, in this illustrated example embodiment: (a) rib 140a includes a leading face 150a and a trailing face 160a that meet at a transversely (or inwardly/outwardly) extending leading edge 170a of rib 140a; (b) rib 140b includes a leading face 150b and a trailing face 160b that meet at a transversely (or inwardly/outwardly) extending leading edge 170b of rib 140b; (c) rib 140c includes a leading face 150c and a trailing face 160c that meet at a transversely (or inwardly/outwardly) extending leading edge 170c of rib 140c; and (d) rib 140d includes a leading face 150d and a trailing face 160d that meet at a transversely (or inwardly/outwardly) extending leading edge 170d of rib 140d.

In this illustrated example embodiment: (a) rib 140a and specifically the leading edge 170a of rib 140a includes an apex 180a at the outermost end point of the leading edge 170a; (b) rib 140b and specifically the leading edge 170b of rib 140b includes an apex 180b at the outermost end point of the leading edge 170b; (c) rib 140c and specifically the leading edge 170c of rib 140c includes an apex 180c at the outermost end point of the leading edge 170c; and (d) rib 140d and specifically the leading edge 170d of rib 140d includes an apex 180d at the outermost end point of the leading edge 170d.

In this illustrated example embodiment: (a) the trailing face 160a of rib 140a extends toward and all the way to the leading face 150b of rib 140b; (b) the trailing face 160b of rib 140b extends toward and all the way to the leading face 150c of rib 140c; (c) the trailing face 160c of rib 140c extends toward and all the way to the leading face 150d of rib 140d; and (d) the trailing face 160d of rib 140d extends toward and all the way to the leading face 150a of rib 140a. In this manner, the ribs 140a, 140b, 140c, and 140d define the entire bottom surface of the bottom portion 130 of the head 110.

It should be appreciated that in other embodiments, the angles of the ribs and particularly the angles of the leading and trailing faces can be slightly varied such that the respective trailing face of one or more of the ribs does not extend all the way to the adjacent rib or the adjacent leading face of that adjacent rib (i.e., it stops short of that adjacent leading face). In such instances, a planer surface on or parallel to plane 134 can be provided between such adjacent ribs.

Figure 1:
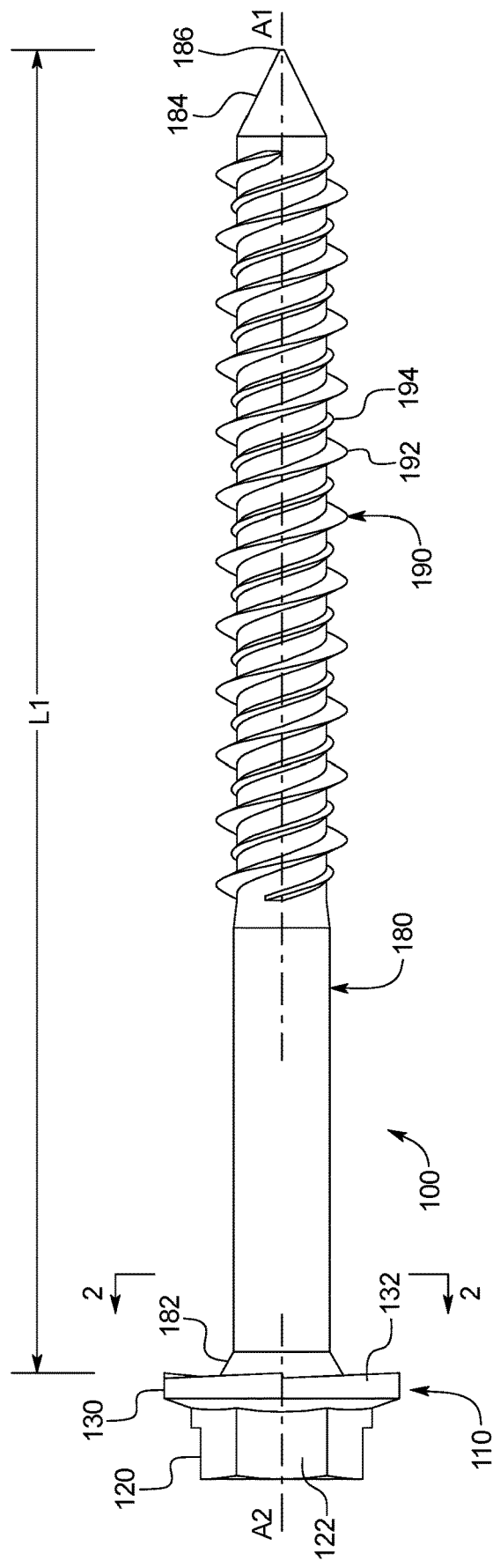
FIG. 1 is a side perspective view of one example embodiment of a threaded fastener of the present disclosure wherein the head includes four ribs that extend toward the tip of the shank.
Figure 2:
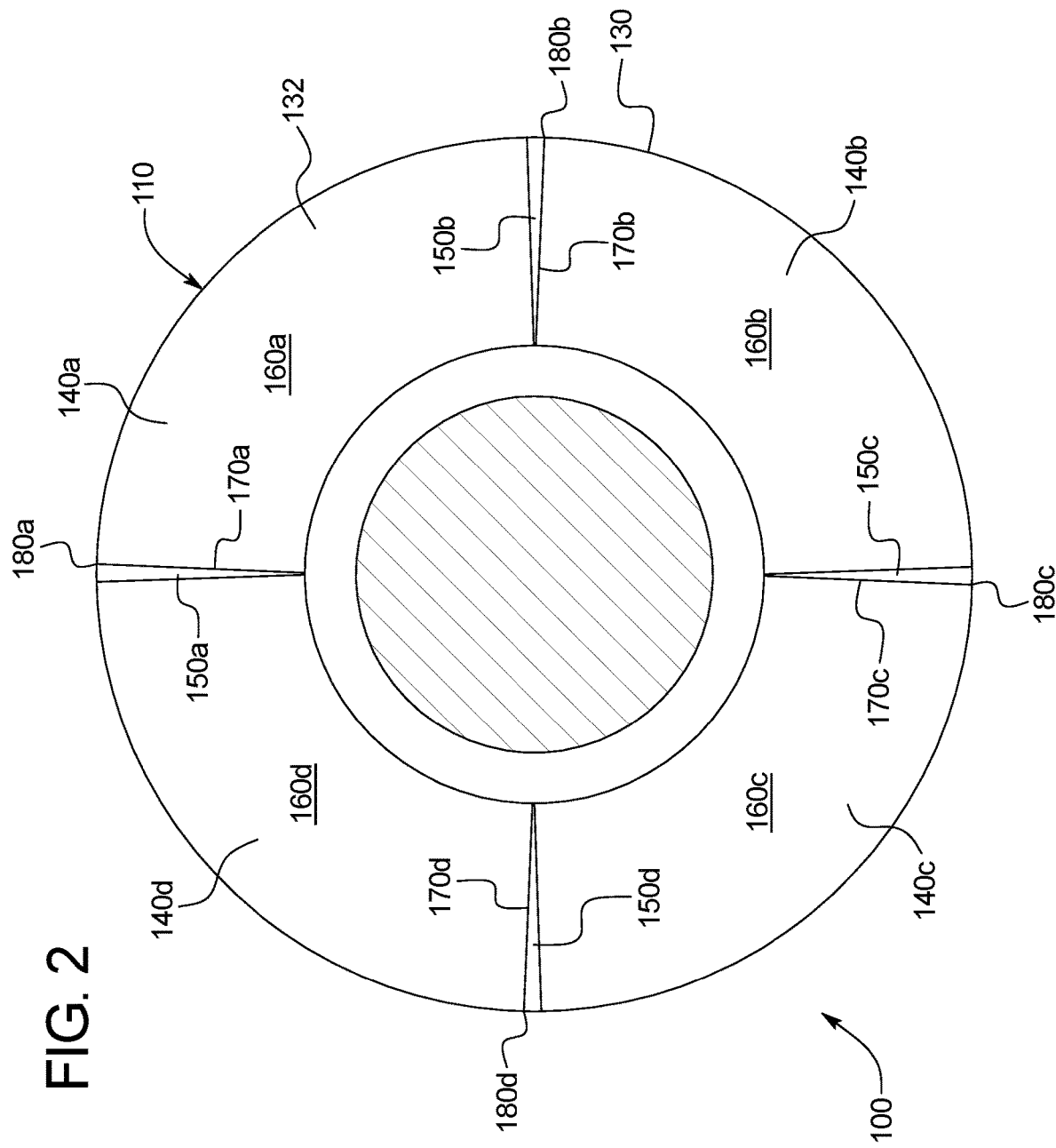
FIG. 2 is an enlarged bottom view of the head of the threaded fastener of FIG. 1 taken substantially through line 2-2 of FIG. 1 (and showing a cross-section of the shank of the fastener).

In this illustrated example embodiment, as best shown in FIGS. 3A, 4, 5, 6, and 7, each of the ribs 140a, 140b, 140c, and 140d is inwardly tapered or angled from the outer surface of the head 110 or of the bottom portion 130 of the head 110 toward the central longitudinal axis A2 of the head 110. The taper in this illustrated example embodiment stops at or adjacent to the shaft 180 as generally shown in FIG. 2.

For example, as shown in FIG. 4, the leading face 150b of rib 140b is inwardly tapered or angled from the outer surface of the head 110 (or of the bottom portion 130 of the head 110) toward the central longitudinal axis A2 of the head 110. Likewise, the trailing face 160b of rib 140b is inwardly tapered or angled from the outer surface of the head 110 (or of the bottom portion 130 of the head 110) toward the central longitudinal axis A2 of the head 110. Thus, the leading edge 170b is also inwardly tapered from the apex 180b at the outermost end point of the leading edge 170b toward the central longitudinal axis A2 of the head 110.

It should thus be appreciated that in this illustrated example embodiment: (a) the leading face 150a is substantially triangular; (b) the leading face 150b is substantially triangular; (c) the leading face 150c is substantially triangular; and (d) the leading face 150d is substantially triangular. It should similarly be appreciated that the leading face of each rib (such as rib 140b) thus has a larger surface area toward the apex (such as apex 180b) of the head 100 than toward the central longitudinal axis A2 of the head 110. In this illustrated example embodiment, the angle of the taper or the angle from the apex toward the central longitudinal axis A2 of the head is approximately 75 degrees. It should be appreciated that each leading face does not need to be triangular or substantially triangular in accordance with the present disclosure. For example, in other embodiments, the leading faces are more trapezoid such that the edges 170a, 170b, 170c, and 1070d do not converge to plane 134, but rather extend to the shaft 180. In such embodiments, the angle of the taper or the angle from the apex toward the central longitudinal axis A2 of the head is approximately 83 or 84 degrees and can be in a range of approximately 60 to 85 degrees.

In this illustrated embodiment, since all of the ribs 140a, 140b, 140c, and 140d are configured and equally sized and spaced around the head 110, for brevity, ribs 140a and 140b are primarily or mainly discussed in additional detail below.

As best shown in FIGS. 3A and 3B, the leading face 150a of rib 140a forms an angle A with respect to the trailing face 160d of the radially adjacent rib 140d. In this illustrated embodiment, angle A is approximately 102.5 degrees. In various other example embodiments of the present disclosure, angle A can range from approximately 92 degrees to approximately 103 degrees; however, it should be appreciated that this range of angles is not meant to limit the present disclosure.

As best shown in FIGS. 3A and 3B, the leading face 150a of rib 140a forms an angle B with respect to a plane 134 extending though the bottom portion 130 of the head 110 and generally parallel with the upper surface of the head 110. In this illustrated embodiment, angle B is approximately 105 degrees. In various other example embodiments of the present disclosure, angle B can range from approximately 90 degrees to approximately 120 degrees; however, it should be appreciated that this range of angles is not meant to limit the present disclosure.

As best shown in FIGS. 3A and 3B, the trailing face 160a of rib 140a forms an angle C with respect to the leading face 150a of the rib 140a. In this illustrated embodiment, angle C is approximately 102.5 degrees. In various other example embodiments of the present disclosure, angle C can range from approximately 92 degrees to approximately 103 degrees; however, it should be appreciated that this range of angles is not meant to limit the present disclosure.

As best shown in FIGS. 3A and 3B, the trailing face 160a of rib 140a forms an angle D with respect to a plane 136 extending though the bottom portion 130 of the head 110 and generally parallel with the top or upper surface of the head 110. In this illustrated embodiment, angle D is approximately 2.5 degrees. In various other example embodiments of the present disclosure, angle D can range from approximately 2 degrees to approximately 12.5 degrees; however, it should be appreciated that this range of angles is not meant to limit the present disclosure.

In this illustrated example embodiment, angle C is equal to angle A. In this illustrated example embodiment, angle D is substantially less than angles A and B such that the leading face 150a is at a substantially sharper angle with respect to an object such as object 10 (see FIGS. 5, 6, and 7), with which the head 110 of the fastener 100 is going to engage, and the trailing face 160a is at a much shallower angle with respect to the object such as object 10. In other words, in this illustrated embodiment, the leading face 150a of the rib 140a (provides a relatively shallow angled face) and the trailing face 160a of rib 140a (provides a relatively steep angled face). This configuration enables the shallow angled rib 140a to abruptly dig in the object as the ribs engage the outer surface of the objects thereby immediately transferring relatively significant force to or through the head 110 and back to the operator of the driving tool as further described below.

It should be appreciated that the angles of the leading face and trailing face of each rib can vary with the size of the fastener in accordance with the present disclosure.

It should be appreciated that the fastener 100 is a right-handed threaded fastener, such that when it is rotated in a clockwise fashion about axis A2 (when looking at the top portion 120 of the head 110), the fastener 100 is tightened or driven, and when rotated in a counter-clockwise fashion about axis A2 (when looking at the top portion 120 of the head 110), the fastener 100 is loosened or backed out.

In other example embodiments of the present disclosure, the fastener is left-hand threaded such that the fastener is configured to be tightened or driven in a counter-clockwise direction and loosened or backed out in a clockwise direction. In such embodiments, the directions of the ribs and particularly the leading faces and trailing faces are reversed.

In use or operation, when the head 110 of the fastener 100 is tightened, driven, or rotated in a clockwise direction, the threads 192 and 194 of the fastener 100 can grip the substrate 20 to drive the shank 180 of the fastener 100 through the object 10 and into the substrate 20. During this driving process, the ribs 140a, 140b, 140c, and 140d are configured to eventually come into contact with the outer surface of the object 10 as generally shown in FIG. 5 (which shows the fastener 100 positioned in a perpendicular orientation to the object 10). Likewise, when the head 110 of the fastener 100 is loosened or backed out, in a counter-clockwise direction, the threads 192 and 194 of the fastener 100 release their grip on substrate 20, and the fastener 100 is backed out of the substrate 20 and the object 10, causing the ribs 140a, 140b, 140c, and 140d to come out of contact with the object 10.

As shown in FIG. 5, as the fastener 100 is tightened (in the clockwise direction), the apexes 180a, 180b, 180c, and 180d of the respective leading edges 170a, 170b, 170c, and 170d of the respective ribs 140a, 140b, 140c, and 140d first come into contact with the outer surface of the object 10 as the fastener 100 is tightened or rotated in the clockwise direction. The leading faces 150a, 150b, 150c, and 150d of the ribs 140a, 140b, 140c, and 140d then come into contact with the outer surface of the object 10 as the fastener 100 is further tightened or rotated in the clockwise direction. The ribs at this point have abruptly come into contact with the outer surface of the object 10.

As shown in FIG. 6, after the apexes 170a, 170b, 170c, and 170d have contacted the object 10 during the tightening process, and the fastener 100 continues to be rotated in a clockwise direction, the relatively sharp angles of the leading faces 150a, 150b, 150c, and 150d of the ribs 140a, 140b, 140c, and 140d further to dig into or bite into the object 10 below the outer surface of the object 10. This creates a relatively substantial frictional torsional resistance (of a desired force level) to the tightening of the fastener 100. This frictional resistance is immediately provided back to the operator through the tightening tool (such as an impact driver) to inform the operator of the tightening tool (such as the operator of the impact driver) that the head 110 has sufficiently engaged the object 10 and that further tightening or clockwise rotation of the fastener 100 is unnecessary. Thus, the ribs 140a, 140b, 140c, and 140d provide protection against over tightening of the fastener 100 by causing such relatively substantial frictional resistance to the tightening that can be immediately felt by the operator of the tightening tool. This reduces the likelihood that the fastener 100 will be over tightened and that the fastener with fail. The structure and configuration of the threaded fastener of the present disclosure thus provide significant advantages in reducing the likelihood of torsional failure of the fastener and thus undesirable failures of the fastener from over tightening.

As mentioned above, FIG. 5 illustrates the relative position of the fastener 100, the head 110 of the fastener 100, and the ribs 104a, 140b, and 140d of the head 110 of the fastener 100 when the fastener 100 is perpendicular to the object 10. However, often times, an operator will not position the fastener 100 perpendicular to the object 10. Thus, FIG. 7 illustrates the relative position of the fastener 100, the head 110 of the fastener 100, and the ribs 104a, 140b, and 140d of the head 110 of the fastener 100 when the fastener 100 is not perpendicular to the object 10. The present disclosure accounts for such situations as shown in FIG. 7, in that one or more of the apexes of the ribs such as apex 180d first abruptly engages the outer surface of the object 10 and as the fastener 100 continues to rotate, the leading face 150d of rib 140d of the fastener 100 digs or bites into the object 10 and provides immediate feedback to the operator of the tightening tool.

It should also be appreciated that when the fastener 100 is loosened or backed out in the counter-clockwise direction, the shallower angle of the trailing edges 160a, 160b, 160c, and 160d of the ribs 140a, 140b, 140c, and 140d lessen the frictional torsional resistance between the head 110 and the object 10 to enable the fastener 100 to be removed more easily.

It should further be appreciated that for such fasteners, having six or less (and particularly four) such configured ribs provides an optimal desired combination of angles for the leading and trailing surfaces of the ribs, and that such relatively fewer ribs provide an unexpected result of optimal performance (as opposed to having more than six ribs extending toward the shaft testing of which showed much poorer results).

It should be appreciated that for example fastener 100, only having four ribs 140a, 140b, 140c, and 140d provides a highly desired and effective combination of angles for the leading and trailing faces of the ribs that provide an unexpected result of optimal performance.

Testing has revealed that six or less, and specifically four such ribs arranged in the manner described above are extremely effective at transferring torque away from the shank of the fastener and back through the tool to the operator. This is partly because at the point when the ribs first engage the object, they do not completely dig in the object, but need to further rotate a certain number of degrees (such as 54 degrees for a ¼ inch fastener with a 0.02 inch maximum height of the tapered leading face; 108 degrees for a ¼ inch fastener with a 0.04 inch maximum height of the tapered leading face; 57.6 degrees for a 3/16 inch fastener with a 0.02 inch maximum height of the tapered leading face; and 115.2 degrees for a 3/16 inch fastener with a 0.04 inch maximum height of the tapered leading face) to fully engage the full rib height. This provides the optimal feedback through the head and back to the fastener driving tool.

In various embodiments, the fastener of the present disclosure and specifically the ribs are made using a cold forming manufacturing process and specifically using a tooling die formed from metal or metal alloys that are suitable to withstand the forces applied. The inward tapering of the ribs reduces the amount of material that must be used to form each rib, and also reduces the stress on the tooling die and improves die life.

Figure 8:
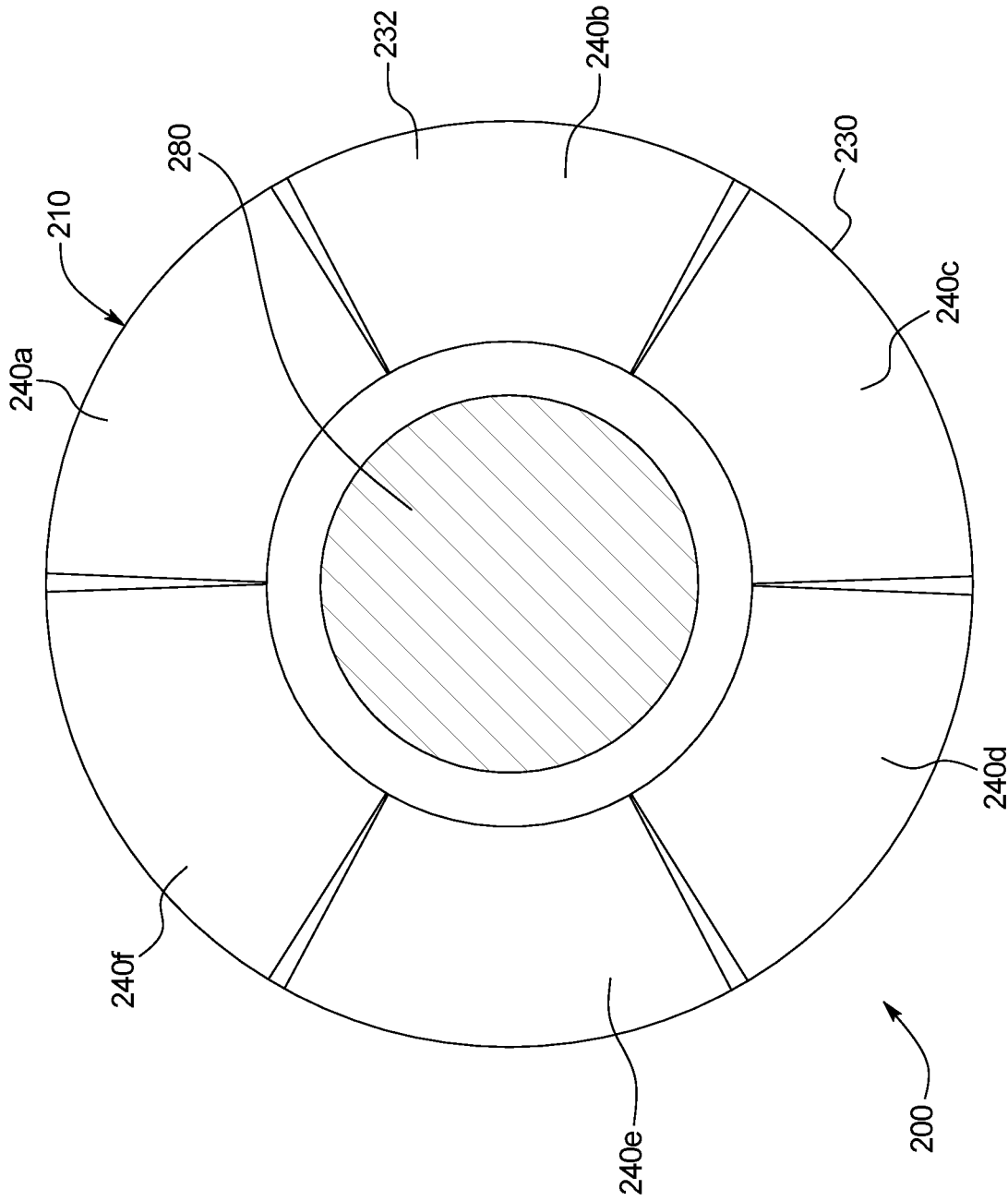
FIG. 8 is an enlarged bottom view of the head of an alternative example embodiment of a threaded fastener of the present disclosure that includes six ribs.
Figure 11A:
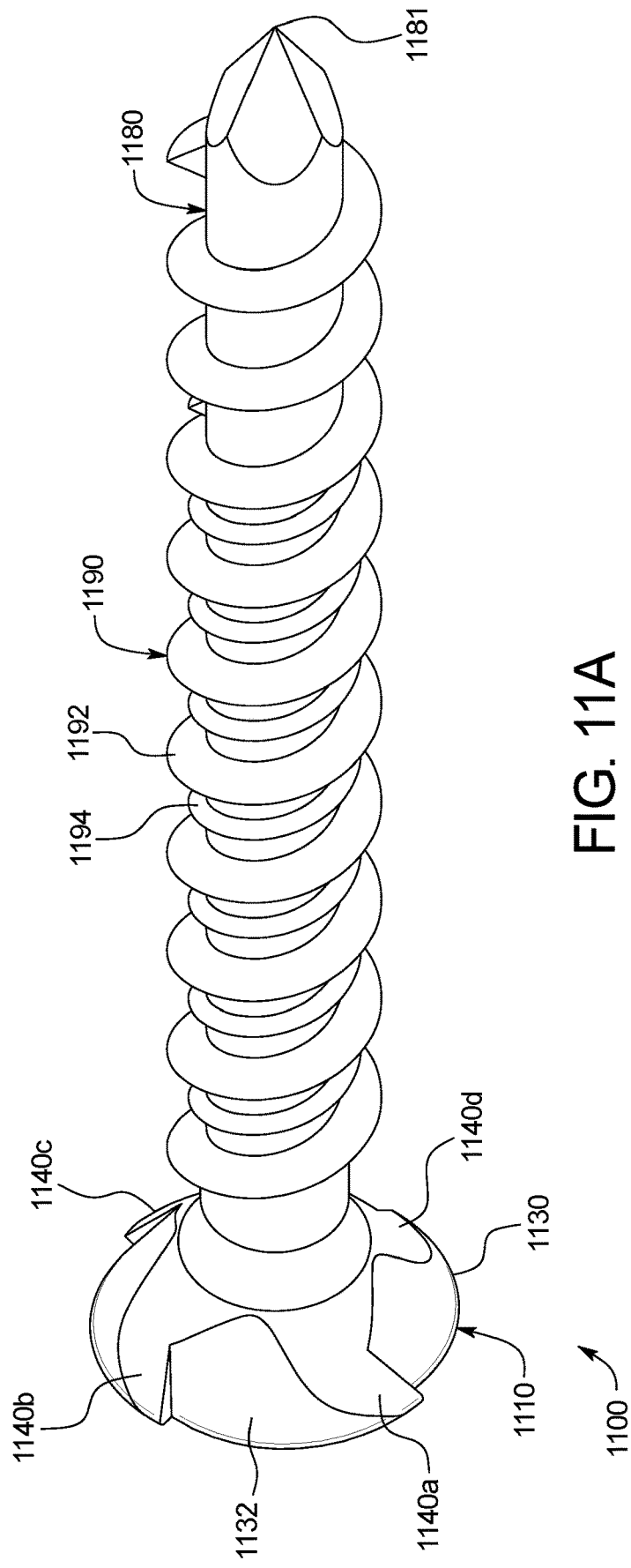
FIG. 11A is a side perspective view of another example embodiment of a threaded fastener of the present disclosure wherein the head includes four multi-part ribs that extend toward the tip of the shank.
Figure 11B:
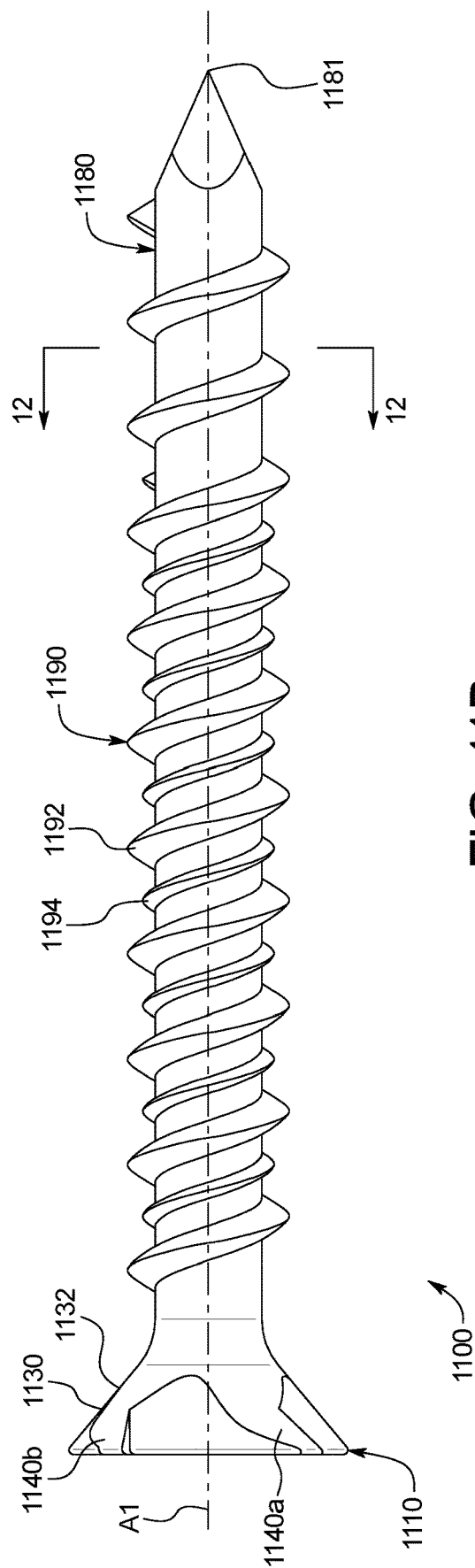
FIG. 11B is a side view of the threaded fastener of FIG. 11.
Figure 12:
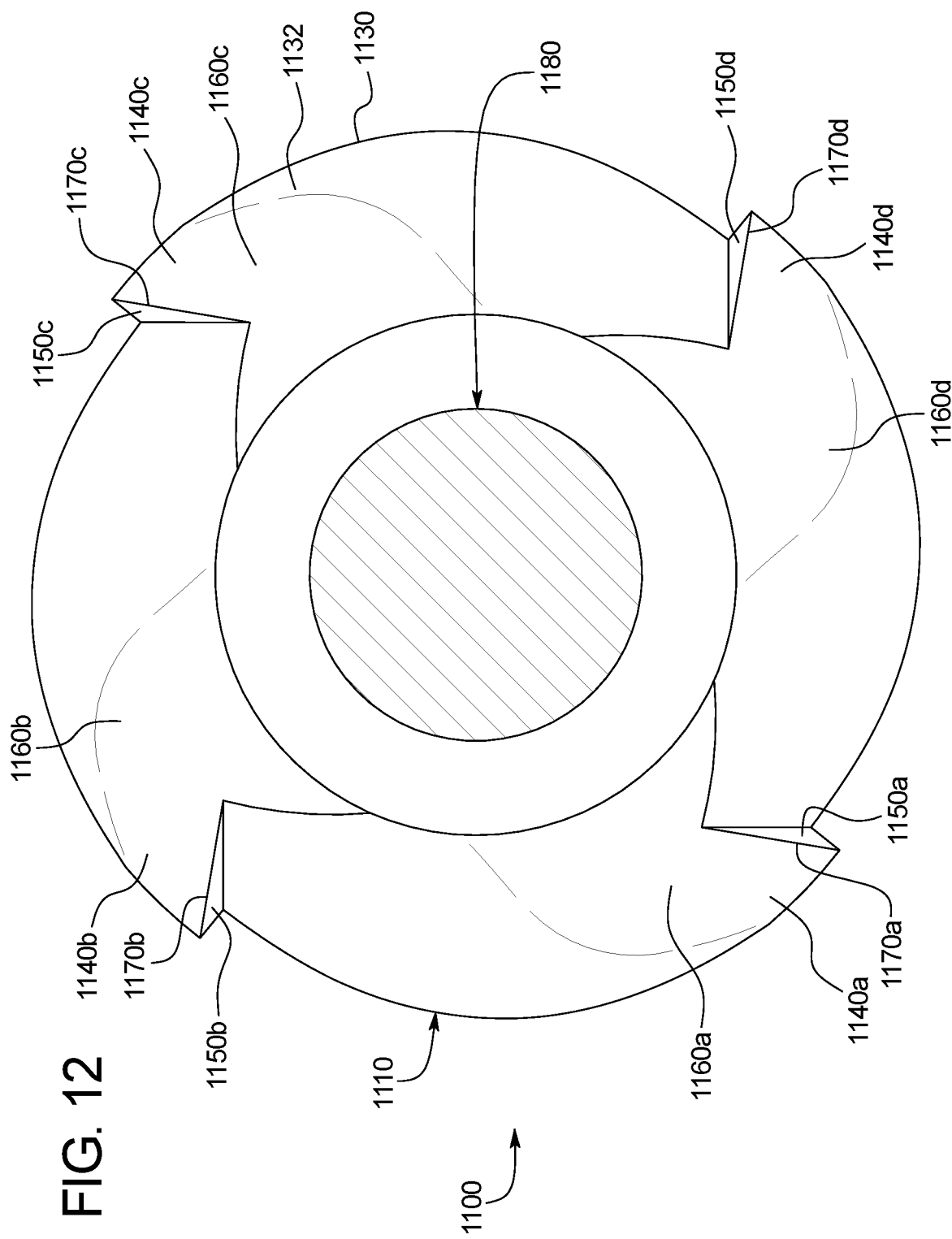
FIG. 12 is an enlarged bottom view of the head of the threaded fastener of FIG. 11A, and taken substantially through line 12-12 of FIG. 11 to show a cross-section of the shank of the threaded fastener.

Referring now to FIG. 8, a threaded fastener 200 of another example embodiment of the present disclosure is generally shown. The fastener 200 is also configured for use in fastening such as anchoring an object to a substrate, and in particular for securing or anchoring an object to a concrete, masonry, or another substrate. The example fastener 200 includes a head 210, a shank 280 (partially shown), and a thread formation (not shown) extending outwardly from the shank 280.

The bottom portion 230 of the head 210 includes a bottom surface 232 formed by a plurality of extrusions or ribs extending toward the tip (not shown) of the shank 280. The extrusions or ribs are arranged radially around a longitudinal axis (not shown) of the head 210.

This illustrated example embodiment includes six identically sized and shaped ribs 240a, 240b, 240c, 240d, 240e, and 240f. In this illustrated example embodiment, each rib includes a leading face and a trailing face that meet at a leading edge of that rib. More specifically, in this illustrated example embodiment: (a) rib 240a includes a leading face and a trailing face that meet at a leading edge of rib 240a; (b) rib 240b includes a leading face and a trailing face that meet at a leading edge of rib 240b; (c) rib 240c includes a leading face and a trailing face that meet at a leading edge of rib 240c; (d) rib 240d includes a leading face and a trailing face that meet at a leading edge of rib 240d; (e) rib 240e includes a leading face and a trailing face that meet at a leading edge of rib 240e; and (f) rib 240f includes a leading face and a trailing face that meet at a leading edge of rib 240f. In this illustrated example embodiment, each of the ribs 240a, 240b, 240c, 240d, 240e, and 240f are also inwardly tapered or angled from the outer surface of the head 210 toward an inner area or the central axis of the head 210.

In this illustrated example embodiment: (a) the trailing face of rib 240a extends toward and all the way to the leading face of rib 240b; (b) the trailing face of rib 240b extends toward and all the way to the leading face of rib 240c; (c) the trailing face of rib 240c extends toward and all the way to the leading face of rib 240d; (d) the trailing face of rib 240d extends toward and all the way to the leading face of rib 240e; (f) the trailing face of rib 240e extends toward and all the way to the leading face of rib 240f; and (g) the trailing face of rib 240f extends toward and all the way to the leading face of rib 240a. In this manner, the ribs 240a, 240b, 240c, 240d, 240e, and 240f define the entire bottom surface of the bottom portion of the head 210.

In this illustrated example embodiment, each of the ribs 240a, 240b, 240c, 240d, 240e, and 240f is inwardly tapered or angled from the outer surface of the head 210 or of the bottom portion 230 of the head 210 toward the central longitudinal axis of the head 210.

During this driving process, the ribs 240a, 240b, 240c, 240d, 240e, and 240f are configured to eventually come into contact with the outer surface of the object. As the fastener 200 is tightened (in the clockwise direction), the leading edges and leading faces of the ribs 240a, 240b, 240c, 240d, 240e, and 240f come into contact with the outer surface of the object as the fastener 200 is tightened or rotated in the clockwise direction. After the fastener 200 continues to be rotated in a clockwise direction, the relatively sharp angles of the leading faces begin to dig into or bite into the object below the outer surface of the object. This creates a desired amount of frictional torsional resistance of a desired force level to the tightening of the fastener 200. This frictional resistance is provided back to the tightening tool (such as an impact driver) to inform the operator of the tightening tool (such as the operator of the impact driver) that the head 210 had sufficiently engaged an object and that further tightening or clockwise rotation of the fastener is unnecessary. Thus, the ribs 240*a*, 240*b*, 240*c*, 240*d*, 240*e*, and 240*f* provide protection against over tightening of the fastener 200, by causing such frictional resistance to the tightening that can be felt by the operator. This reduces the likelihood that the fastener 200 will be over tightened. The structure and configuration of the threaded fastener of the present disclosure provide significant advantages in reducing the likelihood of torsional failure of the fastener and undesirable failures of the fastener from over tightening.

It should also be appreciated that the fastener 200 of this illustrated example embodiment includes six ribs 240*a*, 240*b*, 240*c*, 240*d*, 240*e*, and 240*f*. The combination of these six ribs and the specific leading edges of these ribs provide an optimal combination for providing a desired amount of frictional torsional resistance back to the tightening tool.

It should thus be appreciated from these examples that for many suitably sized threaded anchors of ³⁄₁₆ inch and ¼ inch sizes, that four to six ribs will provide the ideal feedback for the operator of a tightening tool.

It should be appreciated that in other alternative embodiments of the present disclosure, each of the ribs are not identical as shown in the above described embodiments for fastener 100 and fastener 200.

It should be appreciated that the fastener 100 and fastener 200 are made from carbon steel, but can be made from other suitable materials.

The two charts shown in FIGS. 9 and 10 further provide the dimensions for example fasteners made in accordance with the present disclosure. These charts reference the angles A, B, and C from FIGS. 3 and 4.

Figure 15:
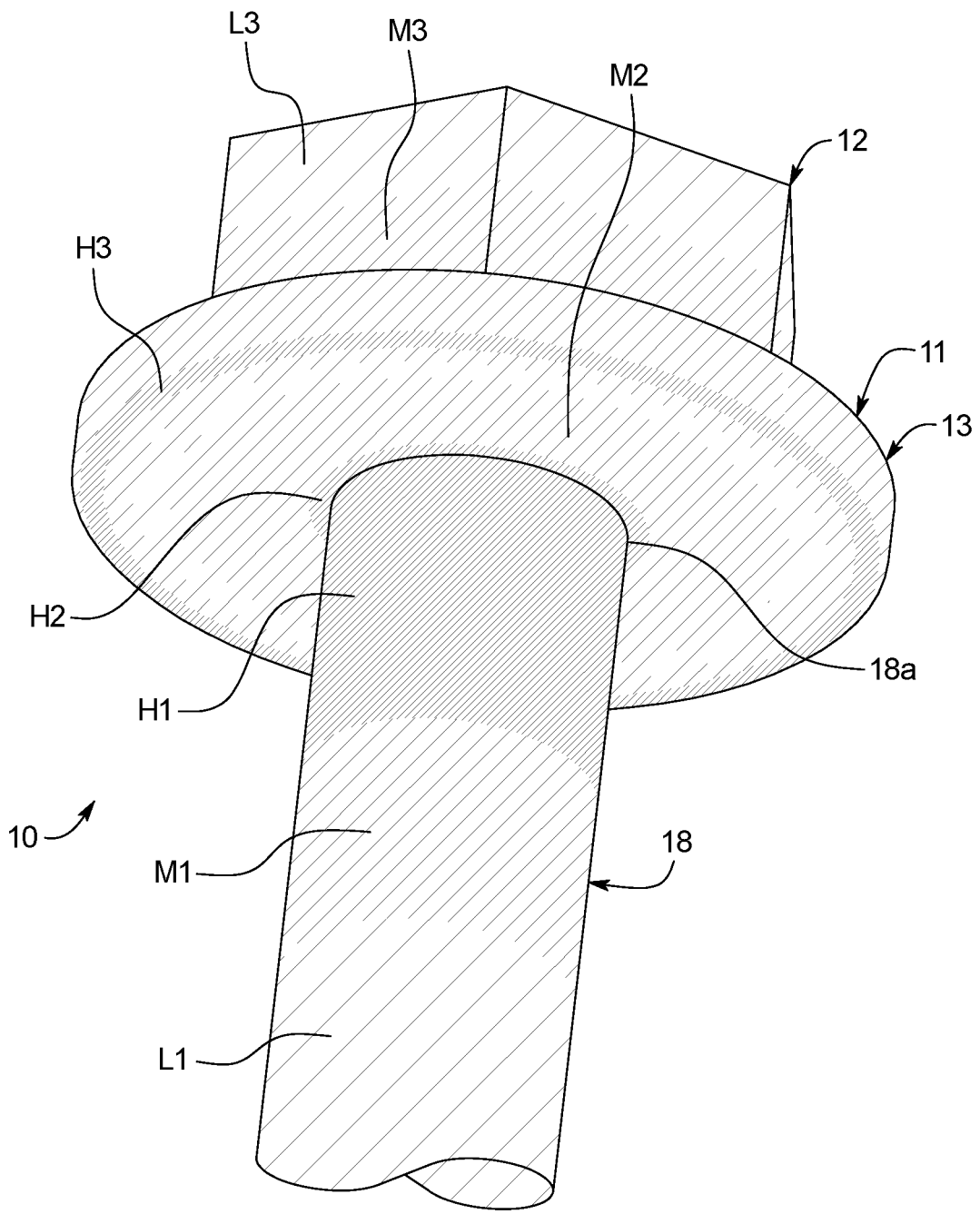
FIG. 15 is a fragmentary side perspective view of a known threaded fastener, and illustrating the stress patterns on the shank and the head of this known threaded fastener determined by a computer simulated stress test conducted on this known threaded fastener.

FIG. 15 shows the results of a stress test (and specifically a computer generated finite element analysis (FEA) simulation) conducted on a known threaded fastener, and specifically the stress patterns on the shank and the head of this known threaded fastener. This known fastener 10 generally includes a head 11, a shank 18 integrally connected to the head 11, and a thread formation (not shown) integrally connected to and extending outwardly from the shank 18. The shank 18 has a first end 18*a* integrally connected to the head 11. The head 11 of the fastener 10 includes a top portion 12 distal to and spaced from the shank 18, and a bottom portion 13 proximate to and integrally connected to the shank 18.

The stress test (and specifically the computer generated FEA simulation) conducted on this known threaded fastener 10 reveals that during the rotational driving process, when the bottom portion 13 comes into contact with the outer surface of an object (not shown), the highest stress levels are placed on: (1) the first end 18*a* of the shank 18 adjacent to the bottom portion 13 of the head 11 (as indicated by pattern H1); (2) an area of the bottom portion 13 of the head 11 adjacent to the first end 18*a* of the shank 18 (as indicated by pattern H2); and (3) an outer area of the bottom portion 13 of the head 11 adjacent to the outer edge of the bottom portion 13 (as indicated by pattern H3).

The stress test (and specifically the computer generated FEA simulation) conducted on this known threaded fastener further reveals that that during the rotational driving process, when the bottom portion 13 comes into contact with the outer surface of an object (not shown), relatively lower stress levels are placed on: (1) an area of the shank adjacent to the first end 18*a* of the shank 18 (as indicated by pattern M1); (2) an area of the bottom portion 13 of the head 11 (as indicated by pattern M2); and (3) an area of the top portion 12 of the head 11 adjacent to the bottom portion 13 (as indicated by pattern M3).

The stress test (and specifically the computer generated FEA simulation) conducted on this known threaded fastener further reveals that that during the rotational driving process, when the bottom portion 13 comes into contact with the outer surface of an object (not shown), even relatively lower stress levels are placed on: (1) an area of the shank further from to the first end 18*a* of the shank 18 (as indicated by pattern L1); (3) an area of the top portion 12 of the head 11 spaced from the bottom portion 13 (as indicated by pattern L3).

Thus, the stress test (and specifically the computer generated FEA simulation) conducted on this known threaded fastener reveals that the highest stress levels are placed on the first end 18*a* of the shank 18, and that area is the most likely area to suffer a rupture or breakage.

Figure 16:
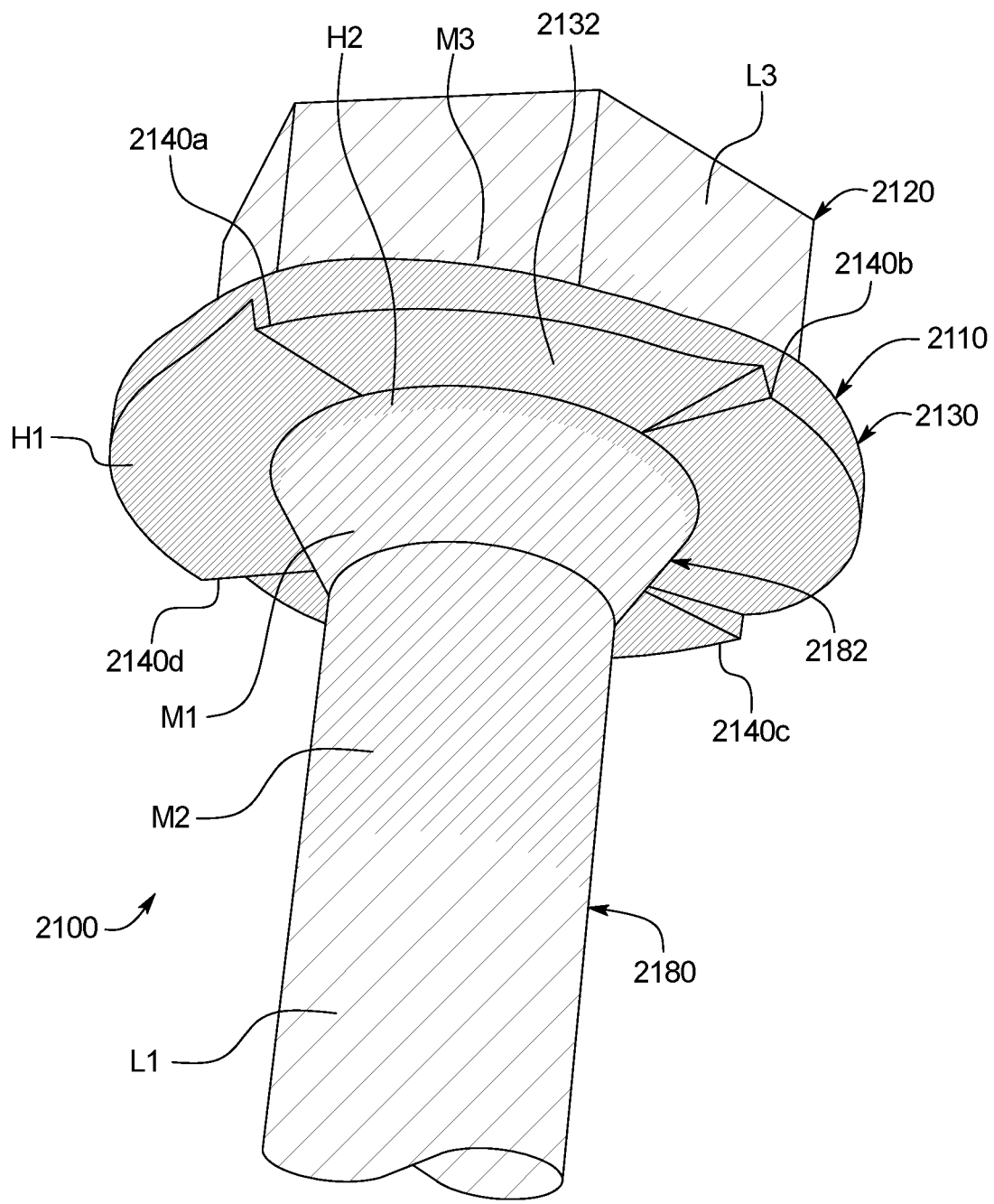
FIG. 16 is a fragmentary side perspective view of the threaded fastener of FIG. 1, and illustrating the stress patterns on the shank and the head of this threaded fastener determined by a computer simulated stress test conducted on this new threaded fastener.

FIG. 16 shows the results of same stress test (and specifically the computer generated FEA simulation) conducted on a sample threaded fastener with a head and shank made generally in accordance with the example embodiment of FIGS. 1 to 7 (described above), and specifically the stress patterns on the shank and the head of this sample threaded fastener. This fastener 2100 generally includes a head 2110, a shank 2180 integrally connected to the head 2110, and a thread formation (not shown) integrally connected to and extending outwardly from the shank 2180. The shank 2180 has a first end that includes a chamfered portion 2182 integrally connected to the head 2110. The head 2110 of the fastener 2100 includes a top portion 1120 distal to and spaced from the shank 2180, and a bottom portion 2130 proximate to and integrally connected to the chamfered portion 2182 of the shank 2180. The bottom portion 2130 of the head 2110 includes a bottom surface 2132 formed by four extrusions or ribs 2140*a*, 2140*b*, 2140*c*, and 2140*d* extending toward the tip (not shown) of the shank 2180. The extrusions or ribs 2140*a*, 2140*b*, 2140*c*, and 2140*d* are arranged radially around the central longitudinal axis of the head 2110 and are configured as described above with respect to FIGS. 1 to 7.

The stress test (and specifically the computer generated FEA simulation) conducted on this sample threaded fastener reveals that that during the rotational driving process, when the bottom portion 2130 comes into contact with the outer surface of an object (not shown), the highest stress levels are placed on: (1) the bottom portion 2130 of the head 2110 including the extrusions or ribs 2140*a*, 2140*b*, 2140*c*, and 2140*d* (as indicated by pattern H1); and (2) a small area of the top of the chamfered portion 2182 of the shank 2180 adjacent to the bottom portion 2130 of the head 2110 (as indicated by pattern H2).

The stress test (and specifically the computer generated FEA simulation) conducted on this sample threaded fastener further reveals that that during the rotational driving process, when the bottom portion 2130 comes into contact with the outer surface of an object (not shown), relatively lower stress levels are placed on: (1) most of the chamfered portion 2182 of the shank 2180 (as indicated by pattern M1); (2) an area of the shank 2180 adjacent to the chamfered portion 2182 of the shank 2180 (as indicated by pattern M2); and (3) an area of the top portion 2120 of the head 2110 adjacent to the bottom portion 2130 (as indicated by pattern M3).

The stress test (and specifically the computer generated FEA simulation) conducted on this sample threaded fastener further reveals that that during the rotational driving process, when the bottom portion 2130 comes into contact with the outer surface of an object (not shown), even relatively lower stress levels are placed on: (1) an area of the shank further from the chamfered portion 2182 of the shank 2180 (as indicated by pattern L1); and (2) an area of the top portion 2120 of the head 2110 spaced from the bottom portion 2130 of the head 2110 (as indicated by pattern L3).

Thus, the stress test (and specifically the computer generated FEA simulation) reveals that the most stress is placed on the bottom portion 2130 of the head 2110 including the extrusions or ribs 2140*a*, 2140*b*, 2140*c*, and 2140*d* (as indicated by pattern H1), and thus that the shank 2180 is substantially less likely to suffer a rupture or breakage.

Referring now to FIGS. 11A, 11B, 12, 13A, 13B, and 14, a threaded fastener 1100 of another example embodiment of the present disclosure is generally shown. The fastener 1100 is also configured for use in fastening such as anchoring an object to a substrate, and in particular for securing or anchoring an object to a concrete, masonry, or another substrate. The example fastener 1100 includes a head 1110, a shank 1180, and a thread formation 1190 extending outwardly from the shank 1180.

In this illustrated example embodiment, the thread formation 1190 includes two different size outwardly extending helical threads 1192 and 1194. More specifically, in this illustrated example embodiment of this present disclosure, the thread formation 1190 includes: (a) a first or primary helical thread formation 1192 along or extending outwardly or transversely from a portion of the shank 1180; and (b) a second or secondary helical thread formation 1194 along or extending outwardly or transversely from a portion of the shank 1180. It should be appreciated that the formation and configuration of the threads of the respective first and second helical thread formations 1192 and 1194 may take on a variety of different forms in accordance with the present disclosure. In one embodiment, the first and second helical thread formations 1192 and 1194 are formed in a manner to maximize grip strength of the fastener 1100 for use in concrete, masonry, and other cementitious substrates. One example of the first and second helical thread formations 1192 and 1194 that may be appropriate for certain applications of the present disclosure are described in U.S. Pat. No. 8,322,960. It should also be appreciated that the quantity of the threads, and specifically the quantity of the first and second helical thread formations may variety in accordance with the present disclosure.

In this illustrated example embodiment, the bottom portion 1130 of the head 1110 includes a bottom surface 1132 formed by a plurality of multi-part extrusions or ribs 1140*a*, 1140*b*, 1140*c*, and 1140*d* extending toward the tip 1181 of the shank 1280. The multi-part extrusions or ribs 1140*a*, 1140*b*, 1140*c*, and 1140*d* are arranged radially around a longitudinal axis A1 of the head 1110. In this illustrated example embodiment, the four multi-part ribs 1140*a*, 1140*b*, 1140*c*, and 1140*d* are identically sized and shaped. It should be appreciated that in other embodiments, these multi-part ribs do not need to be identically sized and shaped.

In this illustrated example embodiment, each multi-part rib includes a multi-part leading face and a multi-part trailing face that meet at a leading edge of that multi-part rib. More specifically, in this illustrated example embodiment: (a) multi-part rib 1140*a* includes a multi-part leading face 1150*a* and a multi-part trailing face 1160*a* that meet at a multi-part leading edge 1170*a* of multi-part rib 1140*a*; (b) multi-part rib 1140*b* includes a multi-part leading face 1150*b* and a multi-part trailing face 1160*b* that meet at a multi-part leading edge 1170*b* of multi-part rib 1140*b*; (c) multi-part rib 1140*c* includes a multi-part leading face 1150*c* and a multi-part trailing face 1160*c* that meet at a multi-part leading edge 1170*c* of multi-part rib 1140*c*; and (d) multi-part rib 1140*d* includes a multi-part leading face 1150*d* and a multi-part trailing face 1160*d* that meet at a multi-part leading edge 1170*d* of multi-part rib 1140*d*.

In this illustrated example embodiment: (a) the multi-part leading face 1150*a* includes a first face and a second face disposed at an obtuse angle from the first face; (b) the multi-part leading face 1150*b* includes a first face and a second face disposed at an obtuse angle; (c) the multi-part leading face 1150*c* includes a first face and a second face disposed at an obtuse angle; and (d) the multi-part leading face 1150*d* includes a first face and a second face disposed at an obtuse angle. It should be appreciated that these angles may vary in accordance with the present disclosure.

In this illustrated example embodiment: (a) the multi-part trailing face 1160*a* includes a first surface and a second surface that generally extends at an obtuse angle from the first surface; (b) the multi-part trailing face 1160*b* includes a first surface and a second surface that generally extends at an obtuse angle from the first surface; (c) the multi-part trailing face 1160*c* includes a first surface and a second surface that generally extends at an obtuse angle from the first surface; and (d) the multi-part trailing face 1160*d* includes a first surface and a second surface that generally extends at an obtuse angle from the first surface.

In this illustrated example embodiment: (a) the multi-part leading edge of rib 1170*a* includes a first edge and a second edge that generally extends at an obtuse angle from the first edge; (b) the multi-part leading edge of rib 1170*b* includes a first edge and a second edge that generally extends at an obtuse angle from the first edge; (c) the multi-part leading edge of rib 1170*c* includes a first edge and a second edge that generally extends at an obtuse angle from the first edge; and (d) the multi-part leading edge 1170*d* includes a first edge and a second edge that generally extends at an obtuse angle from the first edge.

In this illustrated example embodiment: (a) the trailing face of multi-part rib 1140*a* extends toward and all the way to the leading face of multi-part rib 1140*b*; (b) the trailing face of multi-part rib 1140*b* extends toward and all the way to the leading face of multi-part rib 1140*c*; (c) the trailing face of multi-part rib 1140*c* extends toward and all the way to the leading face of multi-part rib 1140*d*; and (d) the trailing face of multi-part rib 1140*d* extends toward and all the way to the leading face of multi-part rib 1140*a*. In this manner, the multi-part ribs 1140*a*, 1140*b*, 1140*c*, and 1140*d* define the entire bottom surface of the bottom portion of the head 1210.

In this illustrated example embodiment, each of the multi-part ribs 1140*a*, 1140*b*, 1140*c*, and 1140*d* are also inwardly tapered or angled from the outer surface of the head 1210 toward an inner area or the central axis A1 of the head 1110.

In this illustrated example embodiment, the top portion of the head is not circular; rather, it is notched. In other example embodiments, the top portion of the head is circular.

In this illustrated example embodiment, the top portion of the head has a star shaped mechanical engaging structure as shown in FIG. 13B. It should be appreciated that it can have any suitable structure.

During this driving process, the multi-part ribs 1140*a*, 1140*b*, 1140*c*, and 1140*d* are configured to eventually come into contact with the outer surface of the object. As the fastener 1100 is tightened (in the clockwise direction), the leading edges and leading faces of the multi-part ribs 1140*a*, 1140*b*, 1140*c*, and 1140*d* come into contact with the outer surface of the object as the fastener 1100 is tightened or rotated in the clockwise direction. After the fastener 1100 continues to be rotated in a clockwise direction, the relatively sharp angles of the multi-part leading faces begin to dig into or bite into the object below the outer surface of the object. This creates a desired amount of frictional torsional resistance of a desired force level to the tightening of the fastener 1100. This frictional resistance is provided back to the tightening tool (such as an impact driver) to inform the operator of the tightening tool (such as the operator of the impact driver) that the head 1110 had sufficiently engaged an object and that further tightening or clockwise rotation of the fastener is unnecessary. Thus, the multi-part ribs 1140a, 1140b, 1140c, and 1140d provide protection against over tightening of the fastener 1200, by causing such frictional resistance to the tightening that can be felt by the operator. This reduces the likelihood that the fastener 1100 will be over tightened. The structure and configuration of the threaded fastener of the present disclosure provide significant advantages in reducing the likelihood of torsional failure of the fastener and undesirable failures of the fastener from over tightening.

It should also be appreciated that the fastener 1100 of this illustrated example embodiment includes four ribs 1140a, 1140b, 1140c, and 1140d. The combination of these four multi-part ribs and the specific leading edges of these multi-part ribs provide an optimal combination for providing a desired amount of frictional torsional resistance back to the tightening tool.

It should be appreciated from the above, that various embodiments of the present disclosure provide a fastener comprising: a shank having a first end and a second end opposite the first end, the second end including a tip, the shank having a first longitudinal axis extending from the first end to the second end; at least one helical thread formation integrally connected to and extending outwardly from the shaft; and a head integrally connected to the first end of the shaft, the head including a top portion and a bottom portion, the top portion defining an engaging structure engageable by a tool, the head having a second longitudinal axis, the bottom portion including a plurality of ribs extending radially around the second longitudinal axis of the head and extending toward the second end of the shaft, wherein each rib includes: (i) a leading face, and (ii) a trailing face that meets the leading face at a transversely extending leading edge of the rib, the leading edge of the rib including an apex at the outermost end point of the leading edge, and wherein each rib is inwardly tapered from an outer surface of the head toward the second longitudinal axis.

In various such embodiments of the fastener, the bottom surface of the head is formed by the ribs.

In various such embodiments of the fastener, the ribs are identically sized and shaped.

In various such embodiments of the fastener, the ribs include: (a) a first rib having a first leading face and a first trailing face that meet at a transversely extending first leading edge; (b) a second rib having a second leading face and a second trailing face that meet at a transversely extending second leading edge; (c) a third rib having a third leading face and a third trailing face that meet at a transversely extending third leading edge; and (d) a fourth rib having a fourth leading face and a fourth trailing face that meet at a transversely extending fourth leading edge.

In various such embodiments of the fastener, (a) the first leading edge of the first rib includes a first apex at an outermost end point of the first leading edge; (b) wherein the second leading edge of the second rib includes a second apex at an outermost end point of the second leading edge; (c) wherein the third leading edge of the third rib includes a third apex at an outermost end point of the third leading edge; and (d) wherein the fourth leading edge of the fourth rib includes a fourth apex at an outermost end point of the fourth leading edge.

In various such embodiments of the fastener, the trailing face of each rib extends toward and all the way to a leading face of an adjacent one of the ribs.

It should further be appreciated from the above, that various embodiments of the present disclosure provide a fastener comprising: a shank having a first end and a second end opposite the first end, the second end including a tip, the shank having a first longitudinal axis extending from the first end to the second end; at least one helical thread formation integrally connected to and extending outwardly from the shaft; and a head integrally connected to the first end of the shaft, the head including a top portion and a bottom portion, the top portion defining an engaging structure engageable by a tool, the head having a second longitudinal axis, the bottom portion including only four, only five, or only six ribs extending radially around the second longitudinal axis of the head and extending toward the second end of the shaft, wherein each rib includes: (i) a leading face; and (ii) a trailing face that meets the leading face at a transversely extending leading edge of the rib, the leading edge of the rib including an apex at the outermost end point of the leading edge, and wherein the trailing face of each rib extends toward and all the way to the leading face of an adjacent one of the ribs.

In various such embodiments of the fastener, a bottom surface of the head is formed by the ribs.

In various such embodiments of the fastener, the ribs are identically sized and shaped.

It should further be appreciated from the above, that various embodiments of the present disclosure provide a fastener comprising: a shank having a first end and a second end opposite the first end, the second end including a tip, the shank having a first longitudinal axis extending from the first end to the second end; at least one helical thread formation integrally connected to and extending outwardly from the shaft; and a head integrally connected to the first end of the shaft, the head including a top portion and a bottom portion, the top portion defining an engaging structure engageable by a tool, the head having a second longitudinal axis, the bottom portion including: (a) a first rib having a first leading face and a first trailing face that meet at a transversely extending first leading edge; (b) a second rib having a second leading face and a second trailing face that meet at a transversely extending second leading edge; (c) a third rib having a third leading face and a third trailing face that meet at a transversely extending third leading edge; and (d) a fourth rib having a fourth leading face and a fourth trailing face that meet at a transversely extending fourth leading edge, wherein the leading edge of each rib including an apex at the outermost end point of the leading edge of that rib, and wherein the trailing face of each rib extends toward and all the way to the leading face of an adjacent one of the ribs.

In various such embodiments of the fastener, the ribs are identically sized and shaped.

It should further be appreciated from the above, that various embodiments of the present disclosure provide a fastener comprising: a shank having a first end and a second end opposite the first end, the second end including a tip, the shank having a first longitudinal axis extending from the first end to the second end; at least one helical thread formation integrally connected to and extending outwardly from the shaft; and a head integrally connected to the first end of the shaft, the head including a top portion and a bottom portion, the top portion defining an engaging structure engageable by a tool, the head having a second longitudinal axis, the bottom portion including: (a) a first rib having a first leading face and a first trailing face that meet at a transversely extending first leading edge; (b) a second rib having a second leading face and a second trailing face that meet at a transversely extending second leading edge; (c) a third rib having a third leading face and a third trailing face that meet at a transversely extending third leading edge; (d) a fourth rib having a fourth leading face and a fourth trailing face that meet at a transversely extending fourth leading edge; and (e) a fifth rib having a fifth leading face and a fifth trailing face that meet at a transversely extending fifth leading edge, wherein the leading edge of each rib including an apex at the outermost end point of the leading edge of that rib, and wherein the trailing face of each rib extends toward and all the way to the leading face of an adjacent one of the ribs.

In various such embodiments of the fastener, the ribs are identically sized and shaped.

It should further be appreciated from the above, that various embodiments of the present disclosure provide a fastener comprising: a shank having a first end and a second end opposite the first end, the second end including a tip, the shank having a first longitudinal axis extending from the first end to the second end; at least one helical thread formation integrally connected to and extending outwardly from the shaft; and a head integrally connected to the first end of the shaft, the head including a top portion and a bottom portion, the top portion defining an engaging structure engageable by a tool, the head having a second longitudinal axis, the bottom portion including: (a) a first rib having a first leading face and a first trailing face that meet at a transversely extending first leading edge; (b) a second rib having a second leading face and a second trailing face that meet at a transversely extending second leading edge; (c) a third rib having a third leading face and a third trailing face that meet at a transversely extending third leading edge; (d) a fourth rib having a fourth leading face and a fourth trailing face that meet at a transversely extending fourth leading edge; (e) a fifth rib having a fifth leading face and a fifth trailing face that meet at a transversely extending fifth leading edge; and (f) a sixth rib having a sixth leading face and a sixth trailing face that meet at a transversely extending sixth leading edge, wherein the leading edge of each rib including an apex at the outermost end point of the leading edge of that rib, and wherein the trailing face of each rib extends toward and all the way to the leading face of an adjacent one of the ribs.

In various such embodiments of the fastener, the ribs are identically sized and shaped.

It should further be appreciated from the above, that various embodiments of the present disclosure provide a fastener comprising: a shank having a first end and a second end opposite the first end, the second end including a tip, the shank having a first longitudinal axis extending from the first end to the second end; at least one helical thread formation integrally connected to and extending outwardly from the shaft; and a head integrally connected to the first end of the shaft, the head including a top portion and a bottom portion, the top portion defining an engaging structure engageable by a tool, the head having a second longitudinal axis, the bottom portion including a plurality of multi-part ribs extending radially around the second longitudinal axis of the head and extending toward the second end of the shaft, wherein each multi-part rib includes: (i) a multi-part leading face, and (ii) a multi-part trailing face that meets the multi-part leading face at a transversely extending multi-part leading edge of the multi-part rib, the multi-part leading edge of the multi-part rib including an apex at the outermost end point of the multi-part leading edge, and wherein each multi-part rib is inwardly tapered from an outer surface of the head toward the second longitudinal axis.

In various such embodiments of the fastener, a bottom surface of the head is formed by the multi-part ribs.

In various such embodiments of the fastener, the multi-part ribs are identically sized and shaped.

In various such embodiments of the fastener, the multi-part ribs include: (a) a first multi-part rib having a first multi-part leading face and a first multi-part trailing face that meet at a transversely extending first multi-part leading edge; (b) a second multi-part rib having a second multi-part leading face and a second multi-part trailing face that meet at a transversely extending second multi-part leading edge; (c) a third multi-part rib having a third multi-part leading face and a third multi-part trailing face that meet at a transversely extending third multi-part leading edge; and (d) a fourth multi-part rib having a fourth multi-part leading face and a fourth multi-part trailing face that meet at a transversely extending fourth multi-part leading edge.

In various such embodiments of the fastener, (a) the first multi-part leading edge of the first multi-part rib includes a first apex at an outermost end point of the first multi-part leading edge; (b) wherein the second multi-part leading edge of the second multi-part rib includes a second apex at an outermost end point of the second multi-part leading edge; (c) wherein the third multi-part leading edge of the third multi-part rib includes a third apex at an outermost end point of the third multi-part leading edge; and (d) wherein the fourth multi-part leading edge of the fourth multi-part rib includes a fourth apex at an outermost end point of the fourth multi-part leading edge.

In various such embodiments of the fastener, the multi-part trailing face of each multi-part rib extends toward and all the way to a multi-part leading face of an adjacent one of the multi-part ribs.

It should further be appreciated from the above, that various embodiments of the present disclosure provide a fastener comprising: a shank having a first end and a second end opposite the first end, the second end including a tip, the shank having a first longitudinal axis extending from the first end to the second end; at least one helical thread formation integrally connected to and extending outwardly from the shaft; and a head integrally connected to the first end of the shaft, the head including a top portion and a bottom portion, the top portion defining an engaging structure engageable by a tool, the head having a second longitudinal axis, the bottom portion including only four, only five, or only six multi-part ribs extending radially around the second longitudinal axis of the head and extending toward the second end of the shaft, wherein each multi-part rib includes: (i) a multi-part leading face; and (ii) a multi-part trailing face that meets the multi-part leading face at a transversely extending multi-part leading edge of the multi-part rib, the multi-part leading edge of the rib including an apex at the outermost end point of the multi-part leading edge, and wherein the multi-part trailing face of each multi-part rib extends toward and all the way to the multi-part leading face of an adjacent one of the multi-part ribs.

In various such embodiments of the fastener, a bottom surface of the head is formed by the multi-part ribs.

In various such embodiments of the fastener, the multi-part ribs are identically sized and shaped.

It should further be appreciated from the above, that various embodiments of the present disclosure provide a fastener comprising: a shank having a first end and a second end opposite the first end, the second end including a tip, the shank having a first longitudinal axis extending from the first end to the second end; at least one helical thread formation integrally connected to and extending outwardly from the shaft; and a head integrally connected to the first end of the shaft, the head including a top portion and a bottom portion, the top portion defining an engaging structure engageable by a tool, the head having a second longitudinal axis, the bottom portion including: (a) a first multi-part rib having a first multi-part leading face and a first multi-part trailing face that meet at a transversely extending first multi-part leading edge; (b) a second multi-part rib having a second multi-part leading face and a second multi-part trailing face that meet at a transversely extending second multi-part leading edge; (c) a third multi-part rib having a third multi-part leading face and a third multi-part trailing face that meet at a transversely extending third multi-part leading edge; and (d) a fourth multi-part rib having a fourth multi-part leading face and a fourth multi-part trailing face that meet at a transversely extending fourth multi-part leading edge, wherein the multi-part leading edge of each multi-part rib including an apex at the outermost end point of the multi-part leading edge of that multi-part rib, and wherein the multi-part trailing face of each multi-part rib extends toward and all the way to the multi-part leading face of an adjacent one of the multi-part ribs.

In various such embodiments of the fastener, the multi-part ribs are identically sized and shaped.

It should further be appreciated from the above, that various embodiments of the present disclosure provide a fastener comprising: a shank having a first end and a second end opposite the first end, the second end including a tip, the shank having a first longitudinal axis extending from the first end to the second end; at least one helical thread formation integrally connected to and extending outwardly from the shaft; and a head integrally connected to the first end of the shaft, the head including a top portion and a bottom portion, the top portion defining an engaging structure engageable by a tool, the head having a second longitudinal axis, the bottom portion including: (a) a first multi-part rib having a first multi-part leading face and a first multi-part trailing face that meet at a transversely extending first multi-part leading edge; (b) a second multi-part rib having a second multi-part leading face and a second multi-part trailing face that meet at a transversely extending second multi-part leading edge; (c) a third multi-part rib having a third multi-part leading face and a third multi-part trailing face that meet at a transversely extending third multi-part leading edge; (d) a fourth multi-part rib having a fourth multi-part leading face and a fourth multi-part trailing face that meet at a transversely extending fourth leading edge; and (e) a fifth multi-part rib having a fifth multi-part leading face and a fifth multi-part trailing face that meet at a transversely extending fifth multi-part leading edge, wherein the multi-part leading edge of each multi-part rib including an apex at the outermost end point of the multi-part leading edge of that multi-part rib, and wherein the multi-part trailing face of each multi-part rib extends toward and all the way to the multi-part leading face of an adjacent one of the multi-part ribs.

In various such embodiments of the fastener, the multi-part ribs are identically sized and shaped.

It should further be appreciated from the above, that various embodiments of the present disclosure provide a fastener comprising: a shank having a first end and a second end opposite the first end, the second end including a tip, the shank having a first longitudinal axis extending from the first end to the second end; at least one helical thread formation integrally connected to and extending outwardly from the shaft; and a head integrally connected to the first end of the shaft, the head including a top portion and a bottom portion, the top portion defining an engaging structure engageable by a tool, the head having a second longitudinal axis, the bottom portion including: (a) a first multi-part rib having a first multi-part leading face and a first multi-part trailing face that meet at a transversely extending first multi-part leading edge; (b) a second multi-part rib having a second multi-part leading face and a second multi-part trailing face that meet at a transversely extending second multi-part leading edge; (c) a third multi-part rib having a third multi-part leading face and a third multi-part trailing face that meet at a transversely extending third multi-part leading edge; (d) a fourth multi-part rib having a fourth multi-part leading face and a fourth multi-part trailing face that meet at a transversely extending fourth multi-part leading edge; (e) a fifth multi-part rib having a fifth multi-part leading face and a fifth multi-part trailing face that meet at a transversely extending fifth multi-part leading edge; and (f) a sixth multi-part rib having a sixth multi-part leading face and a sixth multi-part trailing face that meet at a transversely extending sixth multi-part leading edge, wherein the multi-part leading edge of each rib including an apex at the outermost end point of the multi-part leading edge of that multi-part rib, and wherein the multi-part trailing face of each rib extends toward and all the way to the multi-part leading face of an adjacent one of the multi-part ribs.

In various such embodiments of the fastener, the multi-part ribs are identically sized and shaped.

It will be understood that modifications and variations may be effected without departing from the scope of the novel concepts of the present invention, and it is understood that this application is to be limited only by the scope of the claims.

The invention is claimed as follows:

1. A method of using a fastener to attach an object to a substrate, the fastener including:
   a head having a top portion and a bottom portion, the top portion defining an engaging structure engageable by a tool, the bottom portion including a plurality of ribs, wherein each rib includes a leading face and a trailing face that meets the leading face at a transversely extending leading edge of the rib, wherein the leading edge of the rib includes an apex at the outermost end point of the leading edge, and
   a shank have a first end integrally connected to the head and a second end having a tip,
   the head and the shank having a longitudinal axis, and
   at least one helical thread formation integrally connected to and extending outwardly from the shank,
   said method comprising:
   positioning the fastener adjacent to an object and a substrate; and
   using a tool to rotate the head of the fastener in a first direction about the longitudinal axis to cause the shank to extend through the object and into the substrate, thereby causing tightening of the fastener in the substrate, and such that for each rib, the leading edge of the rib is engageable with the object before the trailing face of the rib.

2. The method of claim 1, wherein each rib extends to the shank.

3. The method of claim 1, wherein each rib is identically sized and shaped.

4. The method of claim 1, wherein each rib is inwardly tapered toward the shank.

5. The method of claim 1, wherein for each rib, the trailing face of the rib does not extend to a leading face of an adjacent one of the ribs.

6. The method of claim 1, wherein the fastener includes only four ribs.

7. The method of claim 1, wherein the fastener includes only five ribs.

8. The method of claim 1, wherein the fastener includes only six ribs.

9. The method of claim 1, which includes causing the ribs to engage and dig into a surface of the object to create a frictional torsional resistance force, and providing the force back to the tool to inform an operator of the tool that the head of the fastener has sufficiently engaged the object to provide protection against over tightening of the fastener.

10. A method of using a fastener to attach an object to a substrate, the fastener including:
- a head having a top portion and a bottom portion, the top portion defining an engaging structure engageable by a tool, the bottom portion including: (a) a first rib having a first leading face and a first trailing face that meet at a transversely extending first leading edge; (b) a second rib having a second leading face and a second trailing face that meet at a transversely extending second leading edge; (c) a third rib having a third leading face and a third trailing face that meet at a transversely extending third leading edge; and (d) a fourth rib having a fourth leading face and a fourth trailing face that meet at a transversely extending fourth leading edge, and
- a shank have a first end integrally connected to the head and a second end having a tip,
- the head and the shank having a longitudinal axis, and
- at least one helical thread formation integrally connected to and extending outwardly from the shank,
- said method comprising:
- positioning the fastener adjacent to an object and a substrate; and
- using a tool to rotate the head of the fastener in a first direction about the longitudinal axis to cause the shank to extend through the object and into the substrate, thereby causing tightening of the fastener in the substrate, and such that for each rib, the leading edge of the rib is engageable with the object before the trailing face of the rib.

11. The method of claim 10, wherein the first, second, third, and fourth ribs each extends to the shank.

12. The method of claim 10, wherein the first, second, third, and fourth ribs are each identically sized and shaped.

13. The method of claim 10, wherein the first, second, third, and fourth ribs are each inwardly tapered toward the shank.

14. The method of claim 10, wherein the first, second, third, and fourth ribs each do not extend to a leading face of an adjacent one of the ribs.

15. The method of claim 14, which includes causing at least one of the first, second, third, and fourth ribs to engage and dig into a surface of the object to create a frictional torsional resistance force, and providing the force back to the tool to inform an operator of the tool that the head of the fastener has sufficiently engaged the object to provide protection against over tightening of the fastener.

16. A method of using a fastener to attach an object to a substrate, the fastener including:
- a head having a top portion and a bottom portion, the top portion defining an engaging structure engageable by a tool, the bottom portion including a plurality of ribs, wherein each rib includes a leading face and a trailing face that meets the leading face at a transversely extending leading edge of the rib, and
- a shank have a first end integrally connected to the head and a second end having a tip,
- the head and the shank having a longitudinal axis, and
- at least one helical thread formation integrally connected to and extending outwardly from the shank,
- said method comprising:
- positioning the fastener adjacent to an object and a substrate; and
- using a tool to rotate the head of the fastener in a first direction about the longitudinal axis to cause the shank to extend through the object and into the substrate, thereby causing tightening of the fastener in the substrate, and causing the leading edge of one of the ribs to engage and dig into a surface of the object to create a frictional torsional resistance force, and providing the force back to the tool to inform an operator of the tool that the head of the fastener has sufficiently engaged the object to provide protection against over tightening of the fastener.

17. The method of claim 16, wherein each rib extends to the shank.

18. The method of claim 16, wherein each rib is identically sized and shaped.

19. The method of claim 16, wherein each rib is inwardly tapered toward the shank.

20. The method of claim 16, wherein for each rib, the trailing face of the rib does not extend to a leading face of an adjacent one of the ribs.

* * * * *